INVENTOR.
*LEIGHTON LEE II*
BY
AGENT

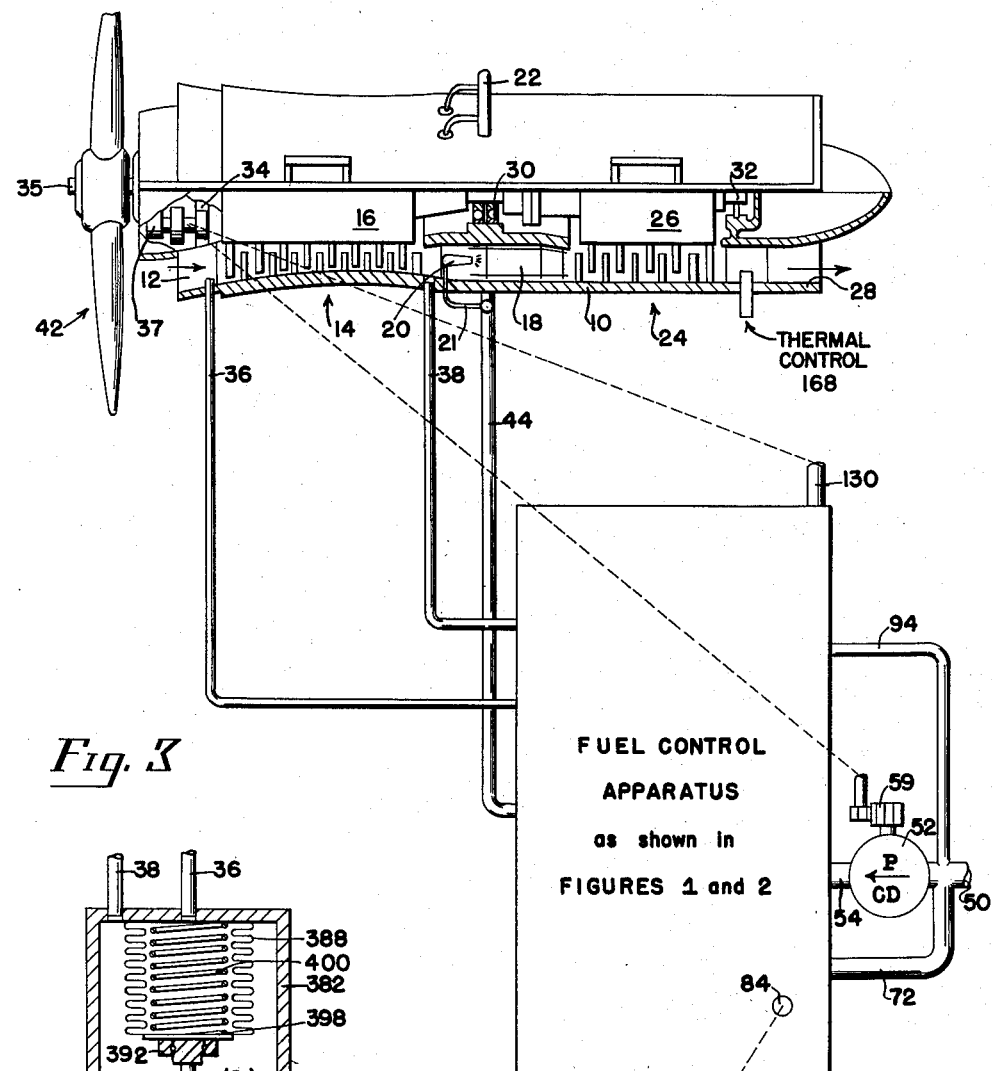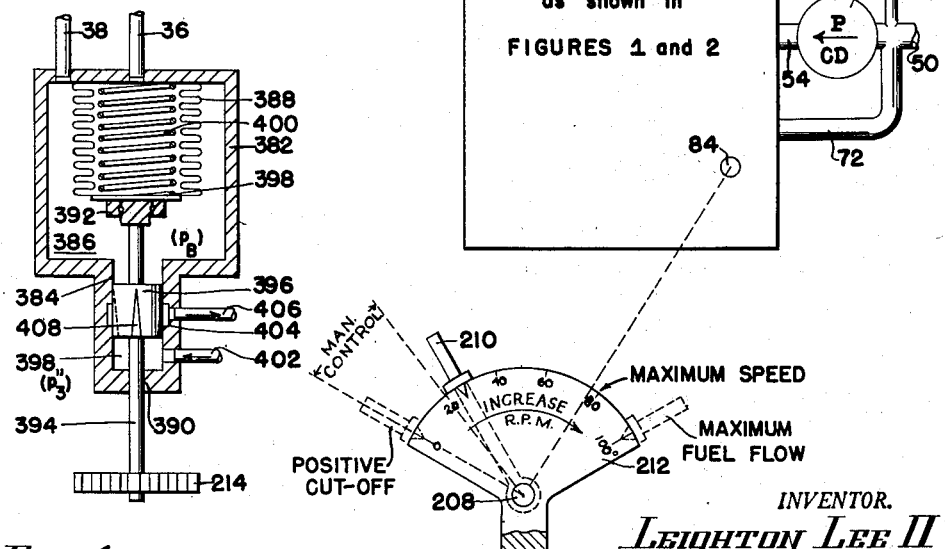

Patented Feb. 9, 1954

2,668,416

UNITED STATES PATENT OFFICE

2,668,416

FUEL CONTROL APPARATUS FOR TURBOJET ENGINES

Leighton Lee II, Rocky Hill, Conn., assignor, by mesne assignments, to Niles-Bement-Pond Company, West Hartford, Conn., a corporation of New Jersey Application September 28, 1946, Serial No. 700,092

34 Claims. (Cl. 60—39.28)

The present invention applies to fuel control apparatus for internal combustion engines inclusive of gas turbine engines, jet-engines, and combination gas-turbine-and-jet engines.

The particular embodiments of my invention shown and described herein are intended for control of fuel delivered to an internal combustion engine suitable for propeller-propulsion, jet-propulsion, or combined propeller-and-jet propulsion of aircraft. Such engines generally include, in the stated order of arrangement, an air inlet, an air compressor, one or more combustion chambers, a gas turbine for converting heat energy to mechanical power, and a tail pipe for discharge of combustion gases to the atmosphere. Associated with the engine is a fuel pump for delivering fuel to the engine and apparatus for control of the fuel delivery.

The turbine drives the compressor and is the primary source of power required to operate certain auxiliary devices. For jet-propulsion, the turbine is of relatively small capacity and a large proportion of the energy of combustion gases discharged from the turbine is converted to thrust in the tail pipe. When a propeller is employed, the turbine converts relatively greater heat energy to mechanical power, being therefore of relatively greater capacity; and the thrust obtainable from the turbine discharge gases is consequently appreciably less than is the case when jet-propulsion alone is employed.

Owing to structural and metallurgical limitations in design and operation of the general type of engine to which the foregoing applies, it is necessary to control fuel flow in respect to limiting values of both engine speed and temperature. It is also desirable to control the fuel flow at any desired engine speed, up to and including the limiting speed, so that the temperature is a predetermined amount less than the limiting temperature. While the significance of the fuel-air ratio is less apparent in operation of such engines than in reciprocating internal combustion engines, the ideal rate of fuel flow to the engine nevertheless bears a predetermined relationship with mass air flow thru the engine, and various means are employable for obtaining a satisfactory indication of the rate of air flow thru the engine.

It is an object of my invention to provide improved apparatus for controlling the fuel flow to an internal combustion engine, the improvement claimed herein resulting from modification of the apparatus shown and claimed in the copending application of Milton E. Chandler, Serial No. 664,412, filed April 23, 1946.

It is also an object of my invention to provide in such control apparatus improved hydraulic and pneumatic means respectively whereby the fuel flow may not exceed values corresponding to limiting values of engine speed and temperature.

Another object of the present invention is to provide improved means in such apparatus for rendering the fuel flow subject to manual control of the operator, whereby the flow may be varied between a maximum value and zero value, at which there is provision for positive cut off.

A further object of the invention disclosed herein is to provide improved control apparatus wherein there is simple means for regulating the fuel flow from a constant delivery pump to the engine.

A still further object of my invention is to provide improved means for rendering the performance of such control apparatus consistently the same under any given condition of operation by imparting rotary motion to critical sliding elements to prevent sticking.

Other objects and advantages of the present invention will become apparent from a consideration of the appended specification, claims, and drawings, in which:

Figure 1:
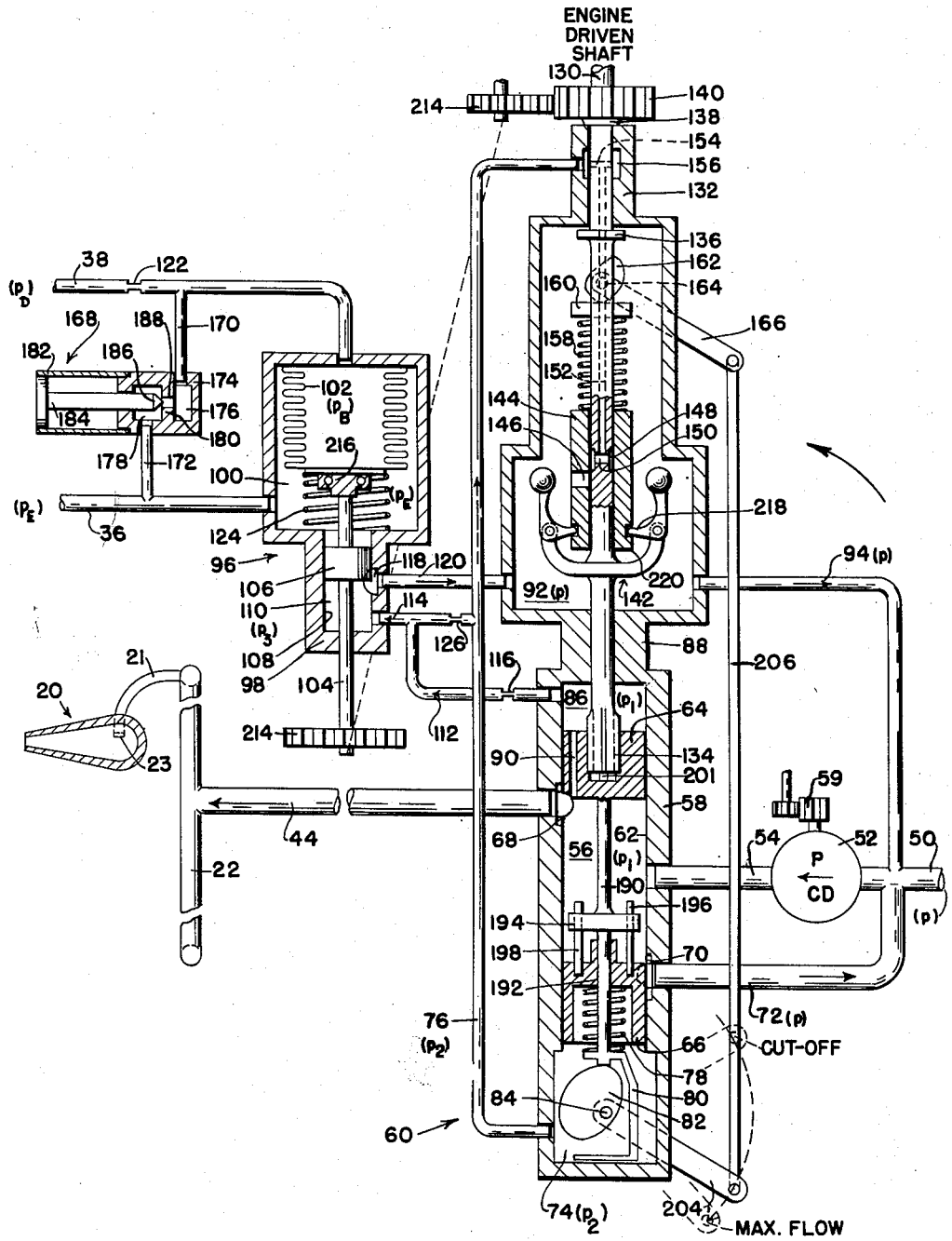
Figure 1 illustrates, somewhat diagrammatically, fuel control apparatus embodying the principles of my invention and its relationship with the fuel pump.
Figure 2:
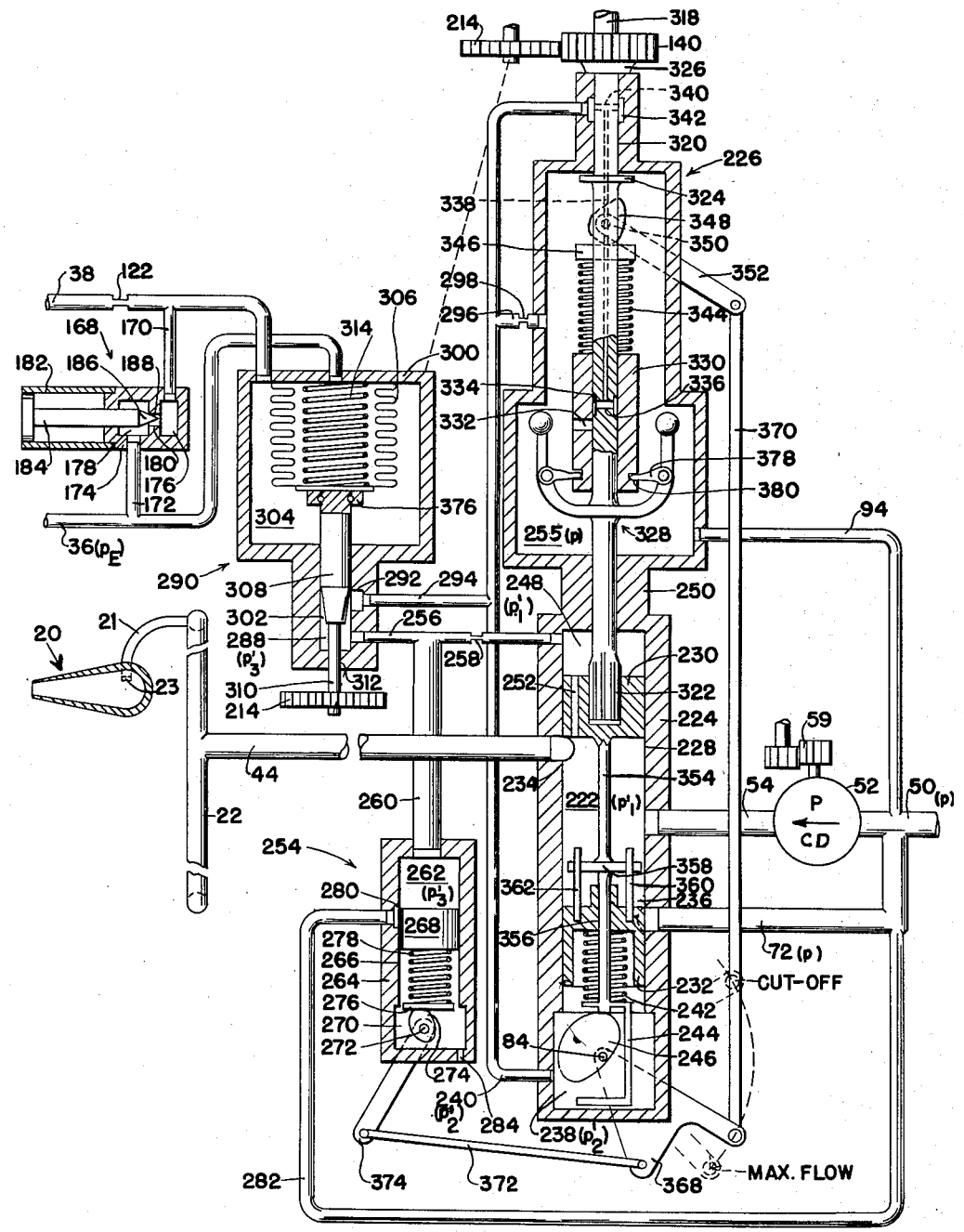
Figure 2 illustrates, somewhat diagrammatically, other fuel control apparatus, including an additional manual control, embodying the principles of my invention.

Figure 3 shows, also somewhat diagrammatically, an internal combustion engine for propeller-and-jet propulsion of aircraft, a manually operated engine control lever and quadrant, and the principal connecting elements between the engine and the fuel control apparatus of Figures 1 and 2; and Figure 4 illustrates, somewhat diagrammatically, a mechanism adaptable for use in lieu of corresponding mechanisms employed in the apparatus of Figures 1 and 2.

Referring to the somewhat diagrammatic illustration of the internal combustion engine shown in Figure 3, there are indicated the principal elements of such an engine suitable for propeller-propulsion or propeller-and-jet propulsion of aircraft, as follows: a supporting casing 10, an air inlet 12, a multi-stage compressor indicated as 14, a compressor rotor shaft 16, a combustion chamber 18, a generally circular manifold 22 for supply of fuel to a number of discharge nozzles 20 thru conduits 21, a multi-stage turbine indicated as 24, a turbine rotor shaft 26 connected to the compressor rotor shaft 16, a tailpipe 28 at the downstream end of casing 10 for discharge of combustion gases from turbine 24, a center bearing 30 and end bearings 32 and 34 supported by casing 10, a propeller shaft 35, a gear train 37 connecting shaft 35 to shaft 16, and a propeller generally shown as 42.

A tube 36 connects the fuel control apparatus to the air entrance 12 in the engine and supplies air to the control apparatus at the static pressure in entrance 12. Similarly, a tube 38 connects the fuel control apparatus to the engine and supplies air to the control apparatus at the static pressure on the discharge side of compressor 14.

A compressor pressure differential is thus obtained which is a function of the compressor characteristics, the engine speed, air entrance pressure and temperature, and variable conditions downstream from the compressor, including variations in combustion temperature, in the fuel flow to the engine, and in the engine brake horsepower. This differential is an indication of mass airflow thru the engine. Assuming constant engine speed, it decreases as altitude increases or as entering air density decreases, and it also decreases as the combustion temperature increases.

The fuel manifold 22 in the engine is connected to the fuel control apparatus by a conduit 44 and it is the function of the apparatus to regulate the fuel pressure in conduit 44 and hence the fuel flow from nozzles 20. The particular nozzles shown in Figure 3, and also shown somewhat diagrammatically in Figures 1 and 2, have a single set of fixed slots 23, one of which is shown in Figures 1 and 2. Fuel is supplied to each of the slots 23 in a manner which causes the fuel to be discharged from nozzles 20 as a swirling spray. Since the nozzle slots are fixed, the fuel flow varies as the square root of the pressure in conduit 44, an extremely high pressure being required therefore when the fuel flow is required to be increased from a relativeley low to a high value. As disclosed in my copending application, Serial No. 86,356, filed April 8, 1949, now Patent No. 2,643,513, in order to avoid extremely high fuel pressures in conduit 44, some engines are provided with two manifolds and nozzles having two separate sets of fixed slots, one set of slots of each nozzle being connected to one manifold and the other set of slots of each nozzle being connected to the other manifold. There is then provided a wide-open flow connection between one manifold and the main fuel conduit corresponding to conduit 44 so that one set of slots in all the nozzles function continuously. A flow divider is installed between the second manifold and the main fuel conduit, however, so that fuel is not permitted to flow from the second set of orifices in each nozzle until the pressure in the main fuel conduit exceeds a predetermined value, following which fuel is gradually supplied to the second manifold as the fuel pressure is increased. By this means, the necessity of otherwise increasing the fuel pressure as a squared function of the desired flow is avoided and the fuel pump and control apparatus may operate under most favorable conditions. In any case, pressure regulation remains the function of the fuel control apparatus which is subject to relatively easily defined modification to suit either type of nozzle construction.

*Figure 1*

Referring to the drawing, Figure 1, there is shown an inlet conduit 50 for the supply of fuel at a relatively low pressure ($p$) to a constant delivery pump 52, from which fuel at superatmospheric pressure ($p_1$) flows thru a discharge conduit 54 into a chamber 56 in a body 58 of a fuel pressure control mechanism generally indicated at 60. Pump 52 is driven by the engine thru gearing 59.

The lower end of body 58 is provided with a generally cylindrical guide 62 in which two valves 64 and 66 are slidably operable, chamber 56 being definable as the space occupied by fuel within guide 62 and between the lower end of valve 64 and the upper end of valve 66. Sliding movement of the cut-off valve 65 controls the effective area of a recessed port 68 in guide 62, port 68 being connected to one end of fuel conduit 44 and thence to the engine.

Sliding movement of valve 66 varies the effective area of another recessed port 70 in guide 62, port 70 being connected by a conduit 72 to inlet conduit 50. Valve 66 separates chamber 56 from another chamber 74 at the lower end of guide 62. A conduit 76 supplies chamber 74 with fuel at a regulated pressure ($p_2$) the value of which is less than that of the pressure ($p_1$) in chamber 56. A spring 78 is in compresison between the lower end of valve 66 and a spring support 80 fixed to a rod 190 which has its upper end connected to valve 64. Rod 190 passes thru an aperture 192 in valve 66 and is operable by a cam 82 on a shaft 84 to vary the deflection of spring 78 and hence the spring force acting on valve 66. Valve 66 is therefore subject to the differential between the force of spring 78 which tends to move it upward to close port 70, and an opposite force tending to move it downward to open port 70. The opposite downward force is produced by the differential ($p_1-p_2$) between the respective pressures in chambers 56 and 74.

Valve 66 serves to maintain a value of the differential between the pressure ($p_1$) in chamber 56 and the pressure ($p_2$) in chamber 74 which is equal to the force (S) of spring 78. The spring force (S) is a function of the spring rate and the spring deflection which, in turn, depends upon the position of support 80.

The fuel flow to the engine thru conduit 44 is a function of the pressure ($p_1$) in chamber 56, the effective area of port 68 and the restriction afforded by slots 23 in nozzles 20 as well as the pressure in combustion chambers 18. As indicated, the effective area of port 68 is controlled by the sliding movement of cut-off valve 64. The pressure ($p_1$) is regulated according to the function ($p_1=p_2+S$). The fuel control apparatus must therefore regulate the pressure ($p_2$) in conduit 76 and chamber 74, provide for control of the deflection of spring 78 and hence the factor (S), and regulate the sliding movement of valve 64 in relation to port 68. In addition, the apparatus must provide positive cut off of valve 64 and simultaneous positive movement of valve 66 to half-open position.

The pressure ($p_2$), hereinafter referred to as the control pressure, is regulated by a compressor pressure differential responsive valve mechanism 96, a thermal control 168, and a speed responsive device 142. The deflection of spring 78 and the position of valve 64 are manually controlled, as are the conditions at cut off.

There is shown a chamber 86 between the upper end of valve 64 and a constriction 88 in body 58, which closes the upper end of guide 62. Chamber 86 is connected to chamber 56 by a channel 90 in valve 64, whereby the pressure in chamber 86 is the same as that in chamber 56; namely, $(p_1)$.

Control valve mechanism 96 has a body 98 containing a cylindrical chamber 100 at its upper end. A bellows 102 has its upper end fixed to the upper end of chamber 100. The lower end of bellows 102 is connected to a shaft 104 which extends downward from bellows 102 and slidably thru the lower end of body 98, body 98 being apertured to provide a shaft seal. A valve 106, fixed to shaft 104, is operable in a guide 108 provided in the lower end of body 98. A chamber 110 is thus formed below valve 106. Chamber 110 is connected by conduits 112 and 114 to chamber 86 in fuel pressure control mechanism 60, there being a restriction 116 in conduit 112. Similarly, a recessed valve port 118 in guide 108 is connected by a conduit 120 thru a chamber 92 in pressure control mechanism 60 to a conduit 94 which is connected to inlet conduit 50 thereby permitting fuel to flow from chamber 86 thru restriction 116 in conduit 112, to conduit 114, into chamber 110 past valve 106, then thru port 118 and conduit 120 to chamber 92. The total pressure drop between chambers 86 and 92 is measured by the differential $(p_1-p)$, there being an intermediate pressure $(p_3)$ in chamber 110.

The interior of bellows 102 is connected to the engine by the discharge pressure tube 38 thru a restriction 122 and is subjected to a pressure designated as $(p_B)$. Chamber 100 is connected to the engine by the entrance pressure tube 36, and is subjected to the pressure $(p_E)$. Bellows 102 is thereby rendered subject to the pressure differential $(p_B-p_E)$. When there is no flow thru restriction 122, the pressure $(p_B)$ equals the compressor discharge pressure $(p_D)$ and the resulting differential acting on bellows 102 is $(p_D-p_E)$. The differential $(p_B-p_E)$ tends to expand bellows 102 and to move valve 106 downward. A spring 124 is in compression between the lower end of bellows 102 and body 98 and tends to collapse the bellows and hence to move valve 106 upward. A downward force is exerted directly on valve 106 by the pressure $(p_E)$ in chamber 100, and there is a corresponding upward force acting directly on the valve due to the pressure $(p_3)$ in chamber 110.

Valve 106 in control valve mechanism 96 is in equilibrium when the following balance of forces is satisfied:

$$(p_B-p_E)A = S + (p_3-p_E)a$$

and $$p_3 = \frac{(p_B-p_E)A}{a} - \frac{S}{a} + p_E$$

in which (A) is the effective area of bellows 102, (a) is the area of valve 106, and (S) is the force of spring 124; (A) and (a) being constants, and (S) being substantially constant. From the above, it is apparent that the pressure $(p_3)$ varies directly as the differential $(p_B-p_E)$ and as the entrance pressure $(p_E)$ vary. The relative effect of $(p_E)$ on the value of $(p_3)$ is small and to simplify explanation of the apparatus, it is possible to neglect $(p_E)$, without introducing a prohibitive error, and to say that the pressure $(p_3)$ varies as the differential $(p_B-p_E)$ varies. However, both the differential $(p_B-p_E)$ and entrance pressure $(p_E)$ decrease as the altitude of flight decreases and thereby tend to render control valve mechanism inherently compensatory for altitude and corresponding changes When there is no flow thru restriction 122, or when $(p_B)=(p_D)$, there is a predetermined value of $(p_3)$ for every value of the compressor pressure differential $(p_D-p_E)$, at a given value of the entrance pressure $(p_E)$.

In control valve mechanism 96, provision is made to rotate valve 106 in order to prevent its sticking. This is accomplished by rotating shaft 104 by means of a gear 214 driven by another gear 140 fixed to a shaft 130, in fuel pressure control mechanism 60, which is driven by the engine at a speed proportional to engine speed. In order that bellows 102 may impart vertical sliding motion to shaft 104 and valve 106 without being subjected to torque due to rotation of shaft 104, the connection between shaft 104 and bellows 102 includes a conventional ball bearing indicated as 216. The ball bearing permits free rotation of shaft 104 relative to bellows 102 while transmitting the vertical movement of either identically to the other.

Conduit 114 is connected thru a restriction 126 to control pressure conduit 76. Fuel may flow from conduit 114 thru restriction 126, upward thru conduit 76 and along a subsequently defined path thru fuel pressure control mechanism 60, into conduit 94 and thence to inlet conduit 50. The control pressure in conduit 76 increases as the pressure in chamber 110 and hence the flow thru restriction 126 increases. Thus, as the compressor pressure differential $(p_D-p_E)$ or the entrance pressure $(p_E)$ increases, the control pressure $(p_2)$ in conduit 76 and chamber 74 increases, and fuel flow to the engine increases.

The thermal control 168 is connected by conduits 170 and 172, respectively, to conduits 38 and 36, the connection between conduits 38 and 170 being at a point in conduit 38 between restriction 122 and bellows 102. Thermal control 168 includes a body 174 having two chambers 176 and 178 separated by a wall 180. Conduit 170 is connected to chamber 176 and conduit 172 is connected to chamber 178. One end of a thin-walled tube 182 is fixed to the closed end of body 174 nearest chamber 178, and has attached to its other end a rod 184 which is slidable in a centrally located aperture in the end of body 174 to which tube 182 is fixed.

The free end of rod 184 is contoured to form a valve 186, which is operable in a seat 188 in wall 180, to regulate flow from conduit 38 thru restriction 122, conduit 170, chamber 176, seat 188, chamber 178 and conduit 172 to conduit 36 and thence to the engine. The tube 182 and rod 184 are made of materials having substantially different coefficients of thermal expansion and the unit is installed in the engine with tube 182 exposed to the temperature of combustion gases in the tailpipe 28 of the engine, Figure 3. As the tailpipe temperature increases, tube 182 expands faster than rod 184 and valve 186 tends to move away from seat 188, thereby increasing the flow from conduit 38 to conduit 36 and causing a decrease in pressure in conduit 170 and in the interior of bellows 102.

Thermal control 168 is generally made so that the valve 186 is closed until the tailpipe temperature exceeds a predetermined value. After the valve 186 opens, bellows 102 is subject to a pressure differential $(p_B-p_E)$ which is less than $(p_D-p_E)$ and the pressure in chamber 110 and hence the control pressure $(p_2)$ in conduit 76 decreases. The fuel flow to the engine then decreases, the value of pressure $(p_D)$ decreases, the engine temperature decreases, valve 186 closes, and the value of pressure ($p_B$) is restored to that of pressure ($p_D$).

Within chamber 92 of the fuel pressure control mechanism 60 speed responsive device 142 is driven by shaft 130 on which is slidably mounted a sleeve valve 144. One end of shaft 130 extends outside mechanism 60, through a bearing 132 at the upper end of body 58 outside chamber 92. The lower end of shaft 130 extends thru constriction 88 in body 58 and has a splined connection 134 with valve 64. Sliding motion of shaft 130 relative to body 58 is prevented by a thrust bearing indicated as 136 and by the hub 138 of gear 140.

Device 142 is effective to control the position of a port 146 in valve 144 relative to an annular groove 148 on shaft 130, port 146 having its outer end opening to chamber 92. The shaft 130 has a diametral passage 150 opening into groove 148, and an axial channel 152 on the shaft centerline connects passage 150 to another diametral passage 154 in shaft 130 at approximately the center of bearing 132. Bearing 132 has an annular groove 156 communicating with passage 154, and groove 156 is connected to control pressure conduit 76.

Thus, when the position of valve 144 causes port 146 to permit passage of fuel from groove 148 to chamber 92, fuel flow may occur from conduit 76 and thru groove 156, diametral passage 154, axial channel 152, to diametral passage 150, past the lower or valving edge of groove 148 into port 146 to chamber 92, whence the fuel flows thru conduit 94 to inlet conduit 50. The flow from control pressure conduit 76 to inlet conduit 50, and hence the pressure in conduit 76, is thus controlled by the effective area of the opening between groove 148 and port 146. The effective area of the opening between groove 148 and port 146 is in turn controlled by the contour of port 146 and by the position of valve 144 relative to shaft 130, and hence by the engine speed; whereby the control pressure ($p_2$) in conduit 76 is a function of engine speed.

Upward movement of valve 144 is opposed by a spring 158 in compression between valve 144 and a support 160 which is slidable on shaft 130. A cam 162 is mounted on a shaft 164 fixed in body 58 and is operable by a lever 166 to vary the position of support 160 and hence the deflection of spring 158. As the deflection of spring 158 increases, and hence as the spring load on valve 144 increases, the speed at which the device 142 becomes effective to raise valve 144, so that port 146 opens into groove 148, increases. For every angular position of lever 166, therefore, there is a predetermined value of speed above which flow may occur from conduit 76, thru port 146, to inlet conduit 50. Whenever the value of engine speed determined by the position of lever 166 is exceeded, the consequent flow from conduit 76 thru port 146 reduces the control pressure in conduit 76 and chamber 74.

The control pressure ($p_2$) has been shown subject to regulation as a function of the compressor pressure differential by control valve mechanism 96, the control pressure ($p_2$) increasing as the compressor pressure differential increases. It has also been shown that the control pressure ($p_2$) is subject to override control in response to speed responsive device 142 by which the control pressure ($p_2$) and hence the fuel flow are reduced whenever the engine speed exceeds a predetermined value. It has been further shown that the control pressure ($p_2$) is indirectly subject to override control by thermal control 168 which reduces the pressure differential acting on bellows 102 whenever a predetermined value of tailpipe temperature is exceeded; and hence the thermal control 168 is effective to reduce the control pressure ($p_2$) and the fuel flow when the predetermined limiting temperature is exceeded.

Rod 190 has fixed thereto a flange 194 above valve 66. Two vertical drive pins 196 and 198 are fixed in valve 66, and are slidable in flange 194, the pins being long enough to extend slightly above flange 194 when maximum separation occurs between the flange and valve 66. Thus, vertical sliding movement of valve 66 is independent of rod 190.

A chamber 201 is provided between the splined lower end of shaft 130 and the bottom of a corresponding splined drive in valve 64 so that sliding movement of valve 64 within its operating range is independent of the rotation of shaft 130. As cam 82 is moved to vary the deflection of spring 78, and hence, to vary the predetermined value of the differential ($p_1 - p_2$), rod 190 is also moved, and, as the deflection of spring 78 is increased, valve 64 is moved upward.

The purpose of the splined connection 134 is to transmit the rotary motion of shaft 130 to valve 64. Similarly, the purpose of flange 194 and pins 196 and 198 is to transmit the rotary motion of valve 64 to valve 66. Valves 64 and 66 are thereby rotated by shaft 130, independently of their respective sliding motions in guide 62, to prevent sticking. Owing to slight friction between the arms 218 of speed responsive device 142 and a groove 220 in valve 144, some rotary movement may be imparted to valve 144 but relative movement between valve 144 and shaft 130 is nevertheless obtained.

There is shown in Figure 3 an engine control lever 210 fixed to a shaft 208 and rotatable thru an arc approximating 100° in reference to a fixed calibrated quadrant 212. The quadrant is shown calibrated in degrees only but, as subsequently explained, it may be calibrated in terms of engine speed between the 20° and 100° positions.

Shaft 208 is connected to shaft 84 of the fuel control apparatus of Figure 1, so that movement of lever 210 is transmitted to shaft 84 and cam 82. On shaft 84 there is fixed a lever 204 connected by a link 206 to lever 166, thereby rendering angular movement of shafts 164 and 84, and of cams 162 and 82, simultaneously responsive to movement of control lever 210, Figure 3.

When control lever 210, Figure 3, is at its extreme limit of counterclockwise travel, it occupies what is referred to as its "positive cut-off" or zero degree position. When lever 210 is at "positive cut off," cam 82 of Figure 1 positions rod 190 so that valve 64 just closes port 68 and fuel flow to the engine is cut off. Spring support 80 extends around cam 82 into the lower end of guide 62 so that when valve 64 just closes port 68, cam 82 is moved counterclockwise from the position shown until it engages the extreme lower end of support 80 and positively holds valve 64 in cut-off position relative to port 68. Simultaneously, flange 194 is in contact with the top of valve 66 and positively holds valve 66 approximately one half open in respect to port 70 in order to positively prevent the possibility of fuel being supplied from pump 52 with both valves 64 and 66 closed. Also, at zero position of control lever 210, the lift of cam 162 is minimum, the load on spring 158 corresponding to any reference position of valve 144 is minimum, and hence the fuel pressure control mechanism 60 is set so that valve 144 opens at a predetermined minimum value of engine speed. Conditions in Figure 1 which apply when control lever 210, Figure 3, is at its zero degree position may be summarized as follows: (a), cut-off valve 64 is positively closed; (b), regulating valve 66 is positively held approximately one half open and the pressure in chamber 56, therefore, is manually controlled; and (c) the speed setting as determined by cam 162 has a minimum value. The vertical heights of ports 68 and 70 are shown to be identical in Figure 1, but considerable flexibility of design is permitted in this respect and it may be desirable to use different width ports.

As control lever 210 is advanced in a clockwise direction from its zero degree position, valves 64 and 66 move upward and the lift of cam 162 increases corresponding to a value of speed greater than the minimum value. When the lever is advanced approximately 20°, it is provided that valve 64 is half open, valve 66 is just free from contact with flange 194 when port 68 is closed, and the lift of cam 162 is further increased to correspond to a greater value of setting speed. At 20° lever position, the opening thru port 68 past valve 64 does not meter. There is, therefore, no pressure loss between chamber 56 and conduit 44 owing to the relatively low value of pressure ($p_1$) and hence small volume of fuel required to flow.

Within the first 20° range of movement of control lever 210, Figure 3, the apparatus of Figure 1 is subject to manual control. On starting the engine, slight movement of lever 210 from "positive cut-off" position slightly opens valve 64, slightly closes valve 66 from half-open position and slightly increases the speed setting determined by cam 162. The pressure ($p_1$) remains sufficiently high during the first 20° lever movement, despite positive positioning of valve 66 in an open position to provide all starting fuel required. Thus thruout the first 20° movement of control lever 210, the fuel flow has a value less than that normally produced as a combined function of the differential ($p_1-p_2$) acting on valve 66 and both the differential ($p_B-p_E$) and the pressure ($p_E$) acting in control valve mechanism 96. The speed responsive device 142 and thermal control 168 remain effective thruout the first 20° range of lever movement.

As control lever 210 is further advanced in a clockwise direction from twenty to approximately eighty degrees in the embodiment shown, the lift of cam 162 increases to a maximum value corresponding to the predetermined maximum allowable or limiting value of engine speed, the rate of setting speed change being in substantially linear relationship with movement of the lever, and quadrant 212, Figure 3, may be calibrated in terms of engine R. P. M. The lift of cam 82 correspondingly increases and the fuel pressure differential ($p_1-p_2$) increases. In steady state operation, the fuel flow to the engine is such that the engine temperature is always a predetermined amount less than the limiting value of the temperature at which valve 186 in thermal control 168 opens. This is accomplished by developing cam 82 so that at maximum values of ($p_B-p_E$) and ($p_E$) and hence at maximum values of the pressure ($p_3$) in control valve mechanism 96 and of the control pressure ($p_2$) in conduit 76, the pressure differential ($p_1-p_2$) provides a value of the pressure ($p_1$) in conduit 44 which satisfies the temperature requirement.

When the pressure ($p_3$), produced as a function of the compressor inlet pressure ($p_E$) and the pressure differential ($p_B-p_E$) acting in mechanism 96, is maximum, there is closest approach to the limiting temperature. As the altitude increases, or as other conditions vary to produce lower values of ($p_B-p_E$) or ($p_E$), at any given speed, the fuel flow is such that there is an increasing predetermined difference between actual and limiting temperature values.

As the control lever 210 is still further advanced from approximately eighty to one hundred-degree quadrant position, the lift of cam 162 and hence the speed setting remains maximum. The lift of cam 82 increases, however, so that the operator again is able to manually control the fuel flow in order to quickly obtain maximum flow regardless of control mechanism 96 or normal regard for avoidance of limiting temperature.

Acceleration occurs as the engine control lever 210 is advanced, the compressor pressure differential increasing as a function of engine speed. Thus, while advance of lever 210 from a first to a second position immediately places cams 82 and 162 in their respective positions corresponding to the second control lever setting, the value of fuel flow and hence the value of the engine speed do not immediately correspond to the second control lever setting. The rate of acceleration is principally controlled by the rate of response of the control valve mechanism 96 to changes in the compressor pressure differential, and is retarded sufficiently, by controlling the area of restriction 122 or other means, so that during acceleration the limiting value of engine temperature is not exceeded.

It is thus shown that the fuel flow is a function of movement of the engine control lever 210, Figure 3, the position of which determines the respective positions of cams 82 and 162. Cam 82 determines the value of the fuel pressure ($p_1$) as a function of the control pressure ($p_2$) which corresponds to the value of compressor pressure differential ($p_D-p_E$) and pressure ($p_E$), when the limiting temperature is not exceeded, and also determines the position of valve 64 which affords manual regulation of fuel flow during the first twenty-degree lever movement from cut-off position. Cam 162 determines the value of speed at which the valve 144 becomes effective to reduce the fuel flow.

It is also shown that the fuel flow is a function of the compressor pressure differential ($p_D-p_E$) and the pressure ($p_E$) acting in the control valve mechanism 96 when the engine temperature does not exceed a predetermined limiting value. Mechanism 96 determines the rate of acceleration of the engine by controlling the rate of fuel flow increase as the compressor pressure differential and inlet pressure increase. It is further shown that thermal control 168 overrides normal control by mechanisms 60 and 96 so that when a predetermined engine temperature is exceeded, the fuel flow becomes a function of a differential ($p_B-p_E$) which is less than the compressor pressure differential ($p_D-p_E$) by an amount which depends on the respective areas of restriction 122 and that of flow past valve 186.

In the embodiment shown in Figure 1, therefore, the fuel flow to the engine is a function of the manually operated engine control lever 210, the compressor pressure differential and inlet pressure, and override controls responsive to the engine temperature and speed. The control valve mechanism 96 responsive to the compressor pressure differential and valve 144 operated by speed responsive device 142 are shown to be connected in parallel between the control pressure conduit 76 and chamber 92 at pressure $(p)$.

*Figure 2*

Referring to the drawing, Figure 2, there is shown an inlet conduit 50 for the supply of fuel at a relatively low pressure $(p)$ to a constant delivery pump 52, from which fuel at superatmospheric pressure $(p'_1)$ flows thru a discharge conduit 54 into a chamber 222, in a body 224 of a fuel pressure control mechanism generally indicated as 226. Pump 52 is driven by the engine thru gearing 59.

The lower end of body 224 is provided with a generally cylindrical guide 228 in which two valves 230 and 232 are slidably operable, chamber 222 being definable as the space occupied by fuel within guide 228 between the lower end of valve 230 and the upper end of valve 232. Sliding movement of the cut-off valve 230 varies the effective area of a recessed port 234 in guide 228, port 234 being connected to one end of fuel conduit 44 and thence to the engine.

Sliding movement of valve 232 varies the effective area of another recessed port 236 in guide 228, port 236 being connected by a conduit 72 to inlet conduit 50. Valve 232 separates chamber 222 from another chamber 238 at the lower end of guide 228. A conduit 240 supplies chamber 238 with fuel at a regulated pressure $(p'_2)$ the value of which is less than that of the pressure $(p'_1)$ in chamber 222. A spring 242 is in compression between the lower end of valve 232 and a spring support 244 fixed to a rod 354 which has its upper end connected to valve 230. Rod 354 passes thru an aperture 356 in valve 232 and is operable by a cam 246 on a shaft 84 to vary the deflection of spring 242 and hence the spring force acting on valve 232. Valve 232 is therefore subject to the differential between the force of spring 242 which tends to move it upward to close port 236, and an opposite force tending to move it downward to open port 236. The opposite downward force is produced by the differential $(p'_1-p'_2)$ between the respective pressures in chambers 222 and 238.

Valve 232 serves to maintain a value of the differential between the pressure $(p'_1)$ in chamber 222 and the pressure $(p'_2)$ in chamber 238 which is equal to the force $(S')$ of spring 242, whence:

$$p'_1 = p'_2 + S'$$

in which the value of $(S')$ depends on the spring rate and the lift of cam 246 and the consequent spring deflection. When the rate of spring 242 is low, $(S')$ may be considered substantially constant regardless of the position of support 244 or movement of valve 232.

The fuel flow to the engine thru conduit 44 is a function of the pressure $(p'_1)$ in chamber 222, the effective area of port 234, and the restriction afforded by slots 23 in nozzles 20 as well as the pressure in combustion chambers 18. As indicated, the effective area of port 234 is controlled by the sliding movement of valve 230, and the pressure $(p'_1)$ is regulated according to the function $(p'_1 = p'_2 + S')$. The fuel control apparatus must, therefore, regulate the pressure $(p'_2)$ in conduit 240 and chamber 238, provide for control of the force $(S')$ due to spring 242, and regulate the sliding movement of valve 230 in relation to port 234. In addition, the apparatus must provide positive cut off of valve 230 and simultaneous positive movement of valve 66 to half-open position.

The pressure $(p'_2)$, hereinafter referred to as the control pressure, is regulated by a compressor pressure differential responsive valve mechanism 290, a thermal control 168, a pressure regulator 254, and a speed responsive device 328. The deflection of spring 242 and the position of valve 232 are manually controlled, as are the conditions at cut off.

There is shown a chamber 248 between the upper end of valve 230 and a constriction 250 in body 224, which closes the upper end of guide 228. Chamber 248 is connected to chamber 222 by a channel 252 in valve 230, whereby the pressure in chamber 248 is the same as that in 222; namely $(p'_1)$.

A conduit 256 is connected to chamber 248 and to a conduit 260 which enters a chamber 262 in pressure regulator 254, there being a restriction 258 in conduit 256 upstream from conduit 260.

Pressure regulator 254 comprises a body 264, a generally cylindrical valve guide 266, a piston 268 in guide 266, separating chamber 262 from another chamber 270, a shaft 272 rotatable in body 264 and extending into chamber 270, a cam 274 fixed to shaft 272, a spring support 276 operable by cam 274, and a spring 278 in compression between support 276 and valve 268. Movement of piston 268 varies the effective area of a port 280 in guide 266, thereby varying flow of fuel from chamber 262 thru a conduit 282 connecting port 280 to drain conduit 72. Chamber 270 has a vent 284 to atmosphere, as shown, or it may be connected to the inlet conduit 50 or other source of fuel at substantially constant gage pressure. Piston 266 is thus subjected to a downward force due to the differential between the respective pressure $(p'_3)$ and $(p_a)$ in chambers 262 and 270. Spring 278 provides an opposing upward force which is substantially constant for a given position of support 276, within the relatively short range of travel in which piston 268 is required to operate. The piston is in equilibrium when the force due to the pressure differential $(p'_3-p_a)$ equals the force of spring 278, from which it is apparent that the gage pressure $(p'_3)$ is substantially constant at any given position of support 276. As cam 274 is rotated to vary the position of support 276 and hence the deflection of spring 278, the pressure $(p'_3)$ varies, increasing as the lift of cam 274 increases. Thus, as shaft 272 and cam 274 are rotated to increase the cam lift, the pressure $(p'_3)$ increases, and it follows that for every angular position of cam 274 there is a corresponding value of the pressure $(p'_3)$ which varies between the values of pressures $(p'_1)$ in chamber 248 and $(p)$ in inlet conduit 50.

The fuel flowing from chamber 262 in pressure regulator 254 is supplied from chamber 248 thru restriction 258, conduit 256 and conduit 260. Normally, only a part of the fuel flowing thru restriction 258 enters chamber 262.

The pressure of fuel in conduit 256 downstream from restriction 258 is the same as that in conduit 260 and chamber 262; namely $(p'_3)$. The balance of fuel flowing from restriction 258 at pressure $(p'_3)$ flows from conduit 256 into a cylindrical chamber 288 in control valve mechanism 290. From chamber 288 the course of flow includes a port 292 provided in chamber 288, a conduit 294 connecting port 292 to the control pressure conduit 240, a conduit 296 connecting conduit 240 to a chamber 255 in the fuel pressure control mechanism 226, whence the fuel flows thru drain conduit 94. Conduit 296 has a restriction 298 therein.

The control valve mechanism 290 has a body 300 containing a valve guide 302, in the lower end of which is chamber 288, and a cylindrical chamber 304 at the closed upper end of body 300. A bellows 306 has its upper end fixed to the upper end of chamber 304. The lower end of bellows 306 is connected to a valve 308 which extends downward from bellows 306 and slidably thru guide 302. A shaft 310 is connected to the lower end of valve 308 thru an aperture 312 in the lower end of body 300. Valve 308 operates in guide 302 to seal chamber 304 from chamber 288 and has a contoured portion opposite port 292 for varying the effective area of port 292 as valve 308 is operated in guide 302.

Chamber 304 and hence the exterior of bellows 306 is connected to the engine by the discharge pressure tube 38 thru a restriction 122 and is subjected to a pressure designated as ($p_B$). The interior of bellows 306 is connected to the engine by the entrance pressure tube 36, and is subject to the pressure ($p_E$). Bellows 306 is thereby subject to the pressure differential ($p_B - p_E$). When there is no flow thru restriction 122, the pressure ($p_B$) equals the compressor discharge pressure ($p_D$) and the resulting pressure differential acting on bellows 306 is ($p_D - p_E$). The differential ($p_B - p_E$) tends to collapse bellows 306 and to move valve 308 upward. A spring 314 inside bellows 306 tends to expand the bellows and hence to move the valve 306 downward. Considering the area of valve 308 negligible or designed to compensate the effect of the differential ($p'_3 - p_E$) acting on the valve, there is the following relationship:

$$(p_B - p_E) A'' = S''$$

in which ($A''$) is the effective area of bellows 306 and ($S''$) is the force exerted by spring 314.

From the above it is apparent that since the factor ($S''$) is a function of the rate and deflection of spring 314 and the travel of bellows 306, for every value of the differential ($p_B - p_E$) there is a corresponding position of valve 308 relative to port 292. When there is no flow thru restriction 122, or when ($p_B$) = ($p_D$), the position of valve 308 is predetermined by the value of the differential ($p_D - p_E$). The valve is contoured to satisfy engine requirements so that the effective area of port 292 increases as the valve moves upward; hence, as the compressor pressure differential increases, the flow from chamber 288 to conduit 294 increases and the control pressure ($p'_2$) in conduit 240 increases.

Provision is made in control valve mechanism 290 to rotate valve 308 in order to prevent its sticking. This is accomplished by rotating shaft 310 by means of a gear 214 driven by another gear 140 fixed to a shaft 318, in fuel pressure regulator 226, which is driven by the engine at a speed proportional to engine speed. In order that bellows 306 may impart vertical sliding motion to valve 308 and shaft 310, without being subjected to torque due to rotation of the shaft, the connection between valve 308 and bellows 306 includes a conventional ball bearing indicated as 376. The ball bearing permits free rotation of valve 308 relative to the bellows while transmitting the vertical movement of either identically to the other.

The thermal control 168 is connected by conduits 170 and 172, respectively, to conduits 38 and 36, the connection between conduits 38 and 170 being at a point in conduit 38 between restriction 122 and the control valve mechanism 290. Thermal control 168 includes a body 174 having two chambers 176 and 178 separated by a wall 180. Conduit 170 is connected to chamber 176 and conduit 172 is connected to chamber 178. One end of a thin walled tube 182 is fixed to the closed end of body 174 nearest chamber 178, and has attached to the other end a rod 184 which is slidable in a centrally located aperture in the end of body 174 to which tube 182 is fixed.

The free end of rod 184 is contoured to form a valve 186, which is operable in a seat 188 in wall 180, to regulate flow from conduit 38, thru restriction 122, conduit 170, chamber 176, seat 188, chamber 178 and conduit 172 to conduit 36 and thence to the engine. The tube 182 and rod 184 are made of materials having substantially different coefficients of thermal expansion and the unit is installed in the engine with tube 182 exposed to the temperature of combustion gases in the tailpipe 28 of the engine, Figure 3. As the tailpipe temperature increases, tube 182 expands faster than rod 184 and valve 186 tends to move away from seat 188, thereby increasing the flow from conduit 44 to conduit 36 and causing a decrease in pressure in conduit 170 and in chamber 304.

Thermal control 168 is generally made so that the valve 186 is closed until the tailpipe temperature exceeds a predetermined value. After the valve 186 opens, bellows 306 is subject to a pressure differential ($p_B - p_E$) which is less than ($p_D - p_E$) and valve 308 descends in guide 302 to further restrict flow thru port 292. As the flow thru port 292 and conduit 294 decreases, the control pressure ($p'_3$) decreases. The fuel flow to the engine then decreases, the value of the pressure ($p_D$) decreases, the engine temperature decreases, valve 186 closes, and the value of the pressure ($p_B$) is restored to that of the pressure ($p_D$).

Within chamber 255 of the fuel pressure control mechanism 226, speed responsive device 328 is driven by shaft 318 on which is slidably mounted a sleeve valve 330. One end of shaft 318 extends outside mechanism 226, thru a bearing 320 at the upper end of body 224 outside chamber 255. The lower end of shaft 318 extends thru constriction 259 in body 224 and has a splined connection 322 with valve 230. Sliding motion of shaft 318 relative to body 224 is prevented by a thrust bearing indicated as 324 and by the hub 326 of gear 140.

Device 328 is effective to control the position of a port 332 in valve 330 relative to an annular groove 334 on shaft 318, port 332 having its outer end opening to chamber 255. The shaft 318 has a diametral passage 336 opening into groove 334, and an axial channel 338 on the shaft centerline connects passage 336 to another diametral passage 340 in shaft 318 at approximately the center of bearing 320. Bearing 320 has an annular groove 342 communicating with passage 340, and groove 342 is connected to control pressure conduit 240.

Thus, when the position of valve 330 causes port 332 to permit passage of fuel from groove 334 to chamber 255, fuel flow may occur from conduit 240 and thru groove 342, diametral passage 340, axial channel 338, to diametral passage 336, past the lower or valving edge of groove 334 into port 332 to chamber 255 whence the fuel flows thru drain conduit 94 to inlet conduit 50. The flow from control pressure conduit 240 to inlet conduit 50, and hence the pressure in conduit 240, is thus controlled by the effective area of the opening between groove 334 and port 332. The effective area of the opening between groove 334 and port 332 is in turn controlled by the contour of port 332 and the position of valve 330 relative to shaft 318 and hence by the engine speed; whereby the control pressure ($p'_2$) in conduit 240 is a function of the engine speed.

Upward movement of valve 330 is opposed by a spring 344 in compression between valve 330 and a support 346 which is slidable on shaft 318. A cam 348 is mounted on a shaft 350 fixed in body 224 and is operable by a lever 352 to vary the position of support 346 and hence the deflection of spring 344. As the deflection of spring 344 increases, and hence as the spring load on valve 330 increases, the speed at which the device 328 becomes effective to raise valve 332, so that port 332 opens into groove 334, increases. For every angular position of lever 352, therefore, there is a predetermined value of speed above which flow may occur from control pressure conduit 240, thru port 332, to inlet conduit 50. Whenever the value of engine speed determined by the position of lever 352 is exceeded, the consequent flow from conduit 240 thru port 332 reduces the control pressure ($p'_2$) in conduit 240 and chamber 238.

The control pressure ($p'_2$) has been shown subject to regulation as a function of the position of cam 274 and the value of pressure ($p'_3$) in regulator 254, the pressure ($p'_2$) increasing as the pressure ($p'_3$) increases. It has also been shown that the control pressure ($p'_2$) is regulated as a function of the compressor pressure differential by control valve mechanism 290, the control pressure ($p'_2$) increasing as the compressor pressure differential increases. Furthermore, the control pressure ($p'_2$) is subject to override control in response to device 328 by which the control pressure ($p'_2$) and hence the fuel flow are reduced whenever the engine speed exceeds a predetermined value. It has been shown, also, that the control pressure ($p'_2$) is indirectly subject to override control by thermal control 168 which reduces the pressure differential acting on bellows 306 whenever a predetermined value of tailpipe temperature is exceeded; and hence thermal control 168 is effective to reduce the control pressure ($p'_2$) and the fuel flow when the predetermined limiting temperature is exceeded.

Rod 354 has fixed thereto a flange 358 above valve 232. Two vertical drive pins 360 and 362 are fixed in valve 232, and are slidable in flange 358, the pins being long enough to extend slightly above flange 358 when maximum separation occurs between the flange and valve 232. Thus, vertical sliding movement of valve 232 is independent of rod 354.

Space is provided between the splined lower end of shaft 318 and the bottom of a corresponding splined drive in valve 230 so that sliding movement of valve 230 is independent of the rotation shaft 318. As cam 246 is moved to vary the deflection of spring 242, and hence to vary the predetermined value of the differential ($p'_1 - p'_2$), rod 354 is also moved; and, as the deflection of spring 242 is increased, valve 230 is moved upward.

The purpose of splined connection 322 at the lower end of shaft 318 is to transmit the rotary motion of the shaft to valve 230. Similarly, the purpose of flange 358 and pins 360 and 362 is to transmit the rotary motion of valve 230 to valve 232. Valves 230 and 232 are thereby rotated by shaft 318, independently of their respective sliding motions in guide 228, to prevent sticking. Owing to slight friction between the arms 378 of speed responsive device 328 and a groove 380 in valve 330, some rotary movement may be imparted to valve 330, but relative movement between the valve and shaft 318 is nevertheless obtained.

Operation of the apparatus of Figure 2 in response to control lever 210, Figure 3, is similar to that of the apparatus of Figure 1, with the addition of the pressure regulator 254. Shaft 208, Figure 3, is connected to shaft 84 of Figure 2 and a lever 368 on shaft 84 is connected by a link 370 to lever 352. A link 372 connects lever 368 to another lever 374 having a fixed connection with cam 274 in pressure regulator 254. Thus, cams 348, 246, and 274 are made simultaneously responsive to movement of control lever 210, Figure 3.

When control lever 210 is at its zero degree or "positive cut-off" position, port 234 is just positively closed by cut-off valve 230, regulating valve 232 is positively held approximately one half open, the lift of cam 274 in pressure regulator 254 has a minimum value, and the value of the speed setting as determined by cam 348 is minimum.

During the initial 20° clockwise movement of control lever 210, fuel flow to the engine is subject to manual control, the flow increasing as the lever is advanced, owing to wider opening of port 234, smaller opening of port 236 and higher lift of cam 274. The speed setting is correspondingly advanced.

At 20° control lever position, cut-off valve 230 is half open, valve 232 is just free from flange 358 when port 236 is closed, and the lifts of cams 348 and 274 respectively are increased to correspond with values of speed and the pressure ($p'_3$) somewhat greater than minimum values.

The lift of cam 246 correspondingly increases, as the control lever 210 is advanced between twenty to eighty-degree positions. In this embodiment, the rate of spring 242 may be relatively great as is true of spring 78, Figure 1. In this case, as the lift of cam 246 increases, the load on spring 242 corresponding to any reference position of valve 232 also increases, and the fuel pressure differential ($p'_1 - p'_2$) increases, the fuel flow to the engine being a direct function of the pressure ($p'_1$), the value of which depends upon the value of the differential ($p'_1 - p'_2$) and that of the control pressure ($p'_2$). On the other hand, the embodiment shown in Figure 2 permits use of a spring 242 having a sufficiently low rate to render the value of the differential ($p'_1 - p'_2$) substantially constant according to a predetermined value. In this case, increased fuel flow as a function of an increased value of ($p'_1$) depends solely upon an increased value of the control pressure ($p'_2$). The rate of spring 242 may be selected to provide some intermediate effect, so that as lever 210 is advanced the value of the differential ($p'_1 - p'_2$) increases at a desired rate, independently of increase of the control pressure ($p'_2$). An alternate arrangement to that shown in Figure 2 is possible by providing a fixed support for spring 242 in lieu of support 244, thereby rendering the spring unresponsive to movement of cam 246.

Simultaneously, as control lever 210 is advanced between any two positions in the second range of movement from twenty to eighty degrees, the lift of cam 274 in pressure regulator 254 increases, the deflection of spring 278 corresponding to any reference position of valve 268 increases, and hence the spring load and the value of the pressure $(p'_3)$ increase. In consequence, the control pressure $(p'_2)$ in conduit 240 increases, at any given position of valve 308 in control valve mechanism 290. Fuel flow to the engine is therefore increased due to an increase in the value of pressure $(p'_1)$ which results from increase of pressure $(p'_2)$ or from increase of both the pressure $(p'_2)$ and the differential $(p'_1-p'_2)$.

In steady state operation, the fuel flow to the engine is such that the engine temperature is always a predetermined amount less than the limiting value of temperature at which valve 186 in thermal control 168 opens. This is accomplished by developing cam 246 and/or cam 274 so that at maximum values of the pressure differential $(p_B-p_E)$ acting on bellows 306 in mechanism 299, or at maximum effective area of opening of port 292, and hence at maximum values of the control pressure $(p'_2)$, the pressure $(p'_1)$ in conduit 44 does not cause fuel flow in excess of the temperature requirement.

As control lever 210 is advanced between eighty-degree and the extreme clockwise position which approximates one hundred degrees in the embodiment shown, the lift of cam 348 remains constant and hence the predetermined speed at which valve 330 becomes effective to limit fuel flow to the engine remains a maximum value. In this third range of lever movement, however, it is provided that the lift of cam 246 or cam 274, or the lift of both cams 246 and 274, increases. The operator is thereby able to manually control the fuel flow in order to obtain maximum flow regardless of normal regard for avoidance of limiting temperature.

Acceleration occurs as the engine control lever 210 is advanced from cut-off to eighty-degree positions, the compressor pressure differential increasing as a function of engine speed. Thus, while advance of lever 210 from a first to a second position immediately places cams 348, 246, and 274 in their respective positions corresponding to the second control lever setting, the value of fuel flow and hence the value of the engine speed do not immediately correspond to the second control lever setting. The rate of acceleration is principally controlled by the rate of response of the control valve mechanism 290 to changes in the compressor pressure differential, and is retarded sufficiently, by controlling the area of restriction 122 or other means, so that during acceleration the limiting value of engine temperature is not exceeded.

In the fuel control apparatus of Figure 1 the value of the differential $(p_1-p_2)$ is controlled by cam 82 and the load of spring 78, $(p_2)$ having a predetermined fixed value for any constant value of the compressor pressure differential. In the control of Figure 1, therefore, at any position of the control lever 210 and a given value of the compressor pressure differential, the control pressure $(p_2)$ has a predetermined fixed value, but the differential $(p_1-p_2)$ increases as the control lever is advanced from twenty to eighty-degree positions, this range being subject to such modification as required to suit peculiarities of the engine and control design. Control of the differential $(p_1-p_2)$ depends on the rate of spring 78 which is desired to be relatively high to produce a suitable range of values of $(p_1-p_2)$ but which is also desired to be relatively low in order that as valve 66 operates to by-pass fuel from chamber 56 to conduit 72 the value of $(p_1-p_2)$ may remain substantially constant. It is therefore necessary to compromise in the selection of spring 78 and to choose one which permits a limited range of mean values of the differential $(p_1-p_2)$. In consequence, at all intermediate control lever positions, between twenty and eighty-degree settings, the average value of $(p_1)$ at any constant value of the compressor pressure differential has an appreciably higher value than is required to produce desired fuel flow corresponding to the speed setting determined by the deflection of spring 158. The speed override control is therefore required to operate over a relatively wide range in reducing the fluel flow to maintain the desired speed.

In the control apparatus of Figure 2, the significance of the differential $(p'_1-p'_2)$ and its control as a function of movement of cam 246 is less apparent than in the control apparatus of Figure 1. We may assume that the value of $(p'_1-p'_2)$ is substantially constant or that variations occurring in the value of $(p'_1-p'_2)$, as valve 232 or cam 246 move, are compensated in design of other elements in the fuel control apparatus. The pressure $(p'_3)$ in regulator 254 increases as the control lever 210 is advanced so that, as the desired speed increases in value and as the consequent required fuel flow increases, the value of $(p'_3)$ is such that the fuel flow producible by the resulting value of control pressure $(p'_2)$ and the pressure $(p'_1)$ is relatively only slightly greater than that required to produce the desired speed. In consequence, valve 330 functions within a narrower range of fuel flow, having to maintain actual fuel flow at a value only slightly less than that obtainable without the governor mechanism. The flexibility of control afforded by use of the pressure regulator 254 of Figure 2 is especially advantageous and design of the governor mechanism of Figure 2 is generally more satisfactory than that of the corresponding mechanism of Figure 1, owing to its narrower range of effect on fuel flow to the engine.

It is thus shown that the fuel flow to the engine from the control apparatus of Figure 2 is a function of the control lever 210, Figure 3, the position of which determines the respective positions of cams 274, 246, and 348. Cam 274 determines the value of the pressure $(p'_3)$ and hence the value of the control pressure $(p'_2)$ corresponding to a constant value of the compressor pressure differential.

Cam 246 determines the position of valve 230 which is closed at cut-off position of the lever and which permits manual control below the twenty-degree lever position; and it also determines the value of the differential $(p'_1-p'_2)$. Cam 348 determines the value of speed at which the governor mechanism 316 becomes effective to reduce the fuel flow.

It is also shown that the fuel flow is a function of the compressor pressure differential acting in the control valve mechanism 290 when the temperature does not exceed a predetermined limiting value. Mechanism 290 determines the rate of acceleration of the engine by controlling the rate of fuel flow increase as the compressor pressure differential increases.

It is further shown that the thermal control unit 168 overrides normal control by the elements 226, 254, and 290 so that when a predetermined engine temperature is exceeded, the fuel flow becomes a function of a differential $(p_B - p_E)$ which is less than the compressor pressure differential $(p_D - p_E)$ by an amount which depends on the respective areas of restriction 122 and that of flow past valve 186.

In the embodiment of Figure 1, therefore, the fuel flow to the engine is a function of the manually operated engine control lever 210, the compressor pressure differential and inlet pressure, and override controls responsive to the engine temperature and speed. The control valve mechanism 290 responsive to the compressor pressure differential and valve 330 operated by speed responsive device 328 are shown to be connected in series to the control pressure conduit 240.

While, as explained, the compressor pressure differential $(p_D - p_E)$ varies as a function of the engine speed, it also varies as a function of other factors including entering air density, combustion temperature, and fuel flow, thus becoming an indication of mass air flow. As the altitude increases, therefore, the value of the compressor pressure differential as well as that of the entrance pressure $(p_E)$ corresponding to any constant value of engine and compressor speed decreases and hence the fuel flow decreases. Control valve mechanism 254 thus serves the additional function of compensating altitude and other air density changes.

Figure 4

Referring to the drawing, Figure 4, there is shown a control valve mechanism adaptable for use in lieu of either the mechanism 96 of Figure 1 or the mechanism 290 of Figure 2. In the control apparatus of Figures 1 and 2, the volume of fuel supplied to mechanisms 96 and 290, respectively, is relatively small and both design and manufacture of the mechanisms 96 and 290 are therefore relatively difficult owing to the small areas of valve ports and the high precision of manufacture required to insure accurate performance. The mechanism of Figure 4 utilizes an improved valving principle which permits use of larger ports and less critical valve contours and results in improved performance.

The control valve mechanism of Figure 4 has a body 382 containing a cylindrical valve guide 384 at its lower end which is closed. Body 382 has a chamber 386 in its upper end, the upper end of guide 384 communicating with the lower end of chamber 386. A bellows 388 has its upper end fixed to the upper end of chamber 386 and its lower end connected to a shaft 394 thru a bearing 392. Bearing 392 permits rotation of shaft 394 with respect to bellows 388 but transmits the vertical motion of bellows 388 to the shaft. Shaft 394 extends downward from bellows 388 thru an aperture 390 in the lower end of body 382.

A valve 396 is fixed to shaft 394 and operates in guide 384 approximately midway of its length. The valve 396 separates chamber 386 from another chamber 398 between the respective lower ends of valve 396 and guide 384.

Chamber 386 and hence the exterior of bellows 388 is connected to the engine of Figure 3 by the discharge pressure tube 38 and is subject to the pressure $(p_B)$. There is a restriction 122 in tube 38 between the mechanism and the engine, as shown in Figures 1 and 2, and a thermal control 168 has connections with conduits 36 and 38, also as shown in Figures 1 and 2. The interior of bellows 388 is connected to the engine by the entrance pressure tube 36, and is subject to the pressure $(p_E)$.

Bellows 388 is thus subject to the pressure differential $(p_B - p_E)$ which tends to collapse it and to move valve 396 upward. The differential $(p_B - p_E)$ equals the compressor pressure differential $(p_D - p_E)$ when the thermal control 168 is inoperative, as when the engine temperature does not exceed a predetermined limiting value. A spring 400 in compression in bellows 388 tends to expand the bellows and hence to move valve 396 downward.

The fuel pressure in chamber 398 is designated $(p''_3)$ corresponding to the pressure in chambers 110 and 288, respectively, of Figures 1 and 2. There is a conduit 402 connected to chamber 398 corresponding to conduit 114 of Figure 1 and to conduit 256 of Figure 2. Also, there is a valve port 404 in guide 384 corresponding to port 118, Figure 1, and to port 292, Figure 2. Similarly, a conduit 406 is connected to port 404, whereby fuel may enter chamber 398 of the mechanism thru conduit 402 and flow therefrom thru port 404 and conduit 406.

Valve 396 is in equilibrium when the sum of the upward forces due to the differential $(p_B - p_E)$ acting on bellows 388 and the differential $(p''_3 - p_E)$ acting on the valve are equal to the downward force of spring 400. The vertical position of valve 396 is therefore determined by the sum of the respective values of the differentials. It is possible, however, to compensate the effect of the differential $(p''_3 - p_E)$, by provision of a balancing element, so that the position of valve 396 may be determined solely by the value of the differential $(p_B - p_E)$ acting on the bellows.

The shaft 394 and valve 396 are rotated by an engine-driven gear 214, as in Figures 1 and 2, and the effects of friction on the vertical motion of the valve are thereby minimized. In Figures 1 and 2, the rotation of valves 106 and 308 accomplishes no other purpose; but, in Figure 4, rotation of valve 396 is an essential requirement. The variation of the port 404 is a function of both the vertical and rotary movement of valve 396.

In Figure 4, port 404 is not required to be uncovered by the lower edge of the valve nor is the valve uniformly tapered to provide means of varying the effective area of port 404. Instead valve 396 is generally cylindrical in shape and has a diameter very slightly less than that of guide 384 to permit sliding and rotary motion while preventing flow of fuel from chamber 398 to chamber 386.

One or more slots 408 is provided in valve 396, each being cut from the lower edge of the valve and extending upward to an unbroken portion of the valve periphery. The width and depth of slots 408 may be varied from one end to the other, as desired, and as shown the slots are of maximum width and depth at the lower end of valve 396 and of minimum width and depth at the upper end of the valve.

As valve 396 is rotated, slots 408 are successively brought into valving position in respect to port 404 and during an interval dependent upon the speed of rotation, each slot permits flow from chamber 398 to port 404 and conduit 406. The flow is interrupted as the unbroken surface of the valve between slots 408 is brought opposite port 404. In consequence of this flow interruption, in order to produce the same change in effective area of port 404 as the valve moves vertically in guide 384, it is necessary to cut slots 408 with considerably greater depth and a wider angle of taper than would be the case if the valving were accomplished by means of the conventional regulating and tapered valves shown in Figures 1 and 2. It is then possible, with the greater dimensions referred to and the consequent relatively greater total volume of slots 408, to obtain appreciably greater accuracy in their manufacture than is possible in manufacture of the tapered portion of valve 308 (Figure 2) for example, with identical manufacturing tolerances in both cases. Within a relatively wide range, the speed of rotation of valve 396 does not affect the rate of flow.

Thus the mechanism of Figure 4 is adaptable to the control apparatus of either Figures 1 and 2 and includes a valve which has both angular and linear motion and is especially advantageous when the volume of flow is relatively small.

While the embodiment of my invention shown and described herein specifies use of collapsible bellows as pressure responsive means, the invention does not preclude employment of pressure responsive pistons, diaphragms, or other means. Also, while the use of an air pressure differential between static compressor discharge and inlet pressures are specified in the embodiments shown and described herein, alternate arrangements include use of single or pairs of bellows in control valve mechanisms of Figures 1, 2 and 4, the bellows being responsive to the compressor rise, the absolute compressor discharge pressure, the compressor discharge gage pressure, the absolute inlet impact pressure, the differential between the compressor discharge pressure and the compressor inlet pressure, or to the differential between static and impact pressures in the course of air flow.

The present invention is not limited to use of a thermal control of the particular rod-and-tube type indicated as 168 in Figures 1 and 2, since any equivalent temperature responsive means is satisfactory.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim as my invention:

1. Fuel control apparatus for a turbo-jet engine having an incorporated air compressor and a constant delivery pump associated with said engine for delivery of fuel thereto, comprising: control means responsive to the pressure differential between the compressor inlet and outlet pressures for deriving a control pressure from the pressure downstream from said pump, and regulating means responsive to said control pressure for regulating said downstream pressure and hence the fuel flow to the engine, whereby the fuel flow to the engine varies as a function of said pressure differential.

2. Fuel control apparatus for a turbo-jet engine having an incorporated air compressor, a conduit for the flow of fuel to said engine, and a constant delivery fuel pump connected to said conduit, comprising: control means responsive to the pressure differential between the compressor inlet and outlet pressures for deriving a control pressure from the pressure in said conduit downstream from said pump, manually operated means, and regulating means responsive to said control pressure and to said manually operated means for regulating said downstream pressure and hence the fuel flow in said conduit, whereby the fuel flow to the engine varies as a function of said pressure differential and said manually operated means.

3. Fuel control apparatus for a turbo-jet engine having an incorporated air compressor, a fuel conduit for the flow of fuel to said engine, and a constant delivery fuel pump connected to said conduit, comprising: a device responsive to the engine speed, first and second control means, said first control means being responsive to an air pressure differential between the compressor inlet and outlet pressures and effective to derive a control pressure from a pressure in said conduit downstream from said pump, said second control means being operated by said speed responsive device and being so constructed and arranged as to limit the value of said control pressure when a predetermined value of engine speed is exceeded, manually operated means, and valve means responsive to said control pressure and to said manually operated means, said valve means being effective to regulate said downsteram pressure and hence the fuel flow in said conduit, whereby the fuel flow to the engine varies as a function of said air pressure differential, said speed, and said manually operated means.

4. Fuel control apparatus for a turbo-jet engine having an incorporated air compressor, a conduit for the flow of fuel to said engine, and a constant delivery fuel pump connected to said conduit, comprising: a device responsive to the engine speed, first and second control means, said first control means being responsive to an air pressure differential between the compressor inlet and outlet pressures and effective to derive a control pressure from the pressure in said conduit downstream from said pump, said second control means being responsive to said device and being so constructed and arranged as to limit the value of said control pressure when a predetermined value of engine speed is exceeded, first and second manually operated means and valve means responsive to said control pressure and to said first manually operated means, said valve means being effective to regulate the pressure and hence the fuel flow in said conduit, said second manually operated means being effective to vary said predetermined value of engine speed, whereby the fuel flow to the engine varies as a function of said air pressure differential said speed, and said manually operated means.

5. Fuel control apparatus for an internal combustion engine having associated therewith a conduit for the flow of fuel thereto, a compressor for the supply of combustion air thereto, and a fuel pump connected to said conduit, comprising: a device responsive to the engine speed, first and second control means, said first control means being responsive to an air pressure derived from a pressure in the engine and effective to derive a control pressure from the pressure in said conduit downstream from said pump, said second control means being responsive to said device and having means effective to limit the value of said control pressure when a predetermined value of engine speed is exceeded, a thermal control responsive to an engine temperature and effective to limit the value of said derived air pressure when a predetermined value of temperature is exceeded, first and second manually operated means, and valve means responsive to said control pressure and to said first manually operated means, said valve means being effective to regulate the pressure and hence the fuel flow in said conduit, said second manually operated means being effective to vary said predetermined value of engine speed, whereby the fuel flow to the engine varies as a function of said engine pressure, said speed, said temperature, and said first and second manually operated means.

6. Fuel control apparatus for a turbo-jet engine having an incorporated air compressor and a constant delivery pump associated with said engine for delivery of fuel thereto, comprising: first valve means responsive to the air pressure differential between the inlet and outlet pressures of said compressor for deriving a control pressure from the fuel pressure downstream from said pump, and second valve means responsive to the differential between said downstream fuel pressure and said control pressure, said second valve means being constructed and arranged to regulate said downstream pressure and hence the fuel flow, whereby the fuel flow to the engine varies as a function of said air pressure differential.

7. Fuel control apparatus for a turbo jet engine having an incorporated air compressor, a conduit for the flow of fuel to said engine, and a constant delivery fuel pump connected to said conduit, comprising: first valve means responsive to the air pressure differential between the inlet and outlet pressure of said compressor for deriving a control pressure from the pressure in said conduit downstream from said pump, manually operated means, and second valve means responsive to the differential between the pressure in said conduit and said control pressure and to said manually operated means, said second valve means being constructed and arranged to regulate said fuel pressure differential and hence the pressure in said conduit, whereby the fuel flow to the engine varies as a function of said pressure downstream from said air pressure differential and said manually operated means.

8. Fuel control apparatus for an internal combustion engine having associated therewith a conduit for the flow of fuel thereto, a compressor for the supply of combustion air thereto, and a constant delivery fuel pump connected to said conduit, comprising: a device responsive to the engine speed, manually operated means, first valve means responsive to the air pressure differential between the inlet and outlet pressures of said compressor and effective to derive a control pressure from the pressure in said conduit downstream from said pump, second valve means responsive to said device and being so constructed and arranged as to limit the value of said control pressure when a predetermined value of engine speed is exceeded, and third valve means responsive to the differential between said downstream pressure and said control pressure and to said manually operated means, said third valve means being effective to regulate said fuel pressure differential and hence said conduit pressure, whereby the fuel flow to the engine varies as a function of said air pressure differential, said speed, and said manually operated means.

9. Fuel control apparatus for an internal combustion engine having associated therewith a conduit for the flow of fuel thereto, a compressor for the supply of combustion air thereto, and a fuel pump connected to said conduit, comprising: a device responsive to the engine speed, first and second manually operated means and a connection therebetween, first valve means responsive to the pressure downstream from said compressor and effective to derive a control pressure from the pressure in said conduit downstream from said pump, second valve means responsive to said device and effective to limit the value of said control pressure when a predetermined value of engine speed is exceeded, third valve means responsive to the differential between said downstream fuel pressure in said conduit and said control pressure and to said first manually operated means, said third valve means being effective to regulate said differential and hence said downstream fuel pressure, and means connected to said second manually operated means effective to cut off the fuel flow in said conduit, whereby the fuel flow to the engine varies as a function of said pressure downstream from said compressor, said speed, and said manually operated means.

10. Fuel control apparatus for an internal combustion engine having associated therewith a conduit for the flow of fuel thereto, a compressor for the supply of combustion air thereto, and a fuel pump connected to said conduit, comprising: a device responsive to the engine speed, first and second manually operated means and a connection therebetween, first valve means responsive to the pressure downstream from said compressor and effective to derive a control pressure from the pressure in said conduit downstream from said pump, second valve means responsive to said device and effective to limit the value of said control pressure when a predetermined value of engine speed is exceeded, third valve means responsive to the differential between said downstream fuel pressure in said conduit and said control pressure and to said first manually operated means, said third valve means being effective to regulate said differential and hence said downstream fuel pressure, and means connected to said second manually operated means effective to positively cut off the fuel flow in said conduit and to simultaneously override control of said third valve means as a function of said differential and said first manually operated means so as to reduce the value of said differential, whereby the fuel flow to the engine varies as a function of said pressure downstream from said compressor, said speed, and said manually operated means.

11. Fuel control apparatus for an internal combustion engine having associated therewith a conduit for the flow of fuel thereto, a compressor for the supply of combustion air thereto, and a fuel pump connected to said conduit, comprising: a device responsive to the engine speed, first and second manually operated means and a connection therebetween, first valve means responsive to a pressure derived from an air pressure in said engine and effective to derive a control pressure from the pressure downstream from said pump, second valve means responsive to said device and effective to limit the value of said control pressure when a predetermined value of engine speed is exceeded, third valve means responsive to the differential between said downstream fuel pressure and said control pressure and to said first manually operated means, said third valve means being effective to regulate said differential and hence said downstream fuel pressure, means connected to said second manually operated means effective to cut off the fuel flow in said conduit, and a thermal control responsive to an engine temperature and effective to limit the value of said derived air pressure when a predetermined value of temperature is exceeded, whereby the fuel flow to the engine varies as a function of said engine air pressure, said speed, said temperature and said manually operated means.

12. Fuel control apparatus for an internal combustion engine having associated therewith a conduit for the flow of fuel thereto, a compressor for the supply of combustion air thereto, a fuel pump connected to said conduit, and an engine control lever, comprising: control means responsive to an air pressure in the engine for deriving a control pressure from the pressure in said conduit downstream from said pump, regulating means responsive to said control pressure for regulating said downstream pressure, and means effective to cut off the flow of fuel to said engine in response to movement of said control lever, whereby the fuel flow to the engine is a function of said engine air pressure and said control lever.

13. Fuel control apparatus for an internal combustion engine having associated therewith a conduit for the flow of fuel thereto, a compressor for the supply of combustion air thereto, a fuel pump connected to said conduit, and a manually operated control lever, comprising: a bellows responsive to an air pressure in said engine, regulating means including a spring, said regulating means being responsive to a fuel pressure differential, the high pressure component of which is the pressure downstream from said pump and being effective to regulate said downstream fuel pressure, valve means responsive to said bellows for regulating the low pressure component of said differential in said regulating means, and means connected to said control lever for cutting off the fuel flow to the engine, whereby the fuel flow varies as a function of said engine air pressure and said control lever.

14. Fuel control apparatus for an internal combustion engine having associated therewith a conduit for the flow of fuel thereto, a compressor for the supply of combustion air thereto, a fuel pump connected to said conduit and a manually operated control lever, comprising: a bellows having a spring connected thereto, said bellows being responsive to an air pressure in said engine in opposition to said spring, a first control means operable by said bellows and effective to derive a control pressure from the pressure downstream from said pump, a device responsive to the speed of the engine, valve means operated by said device and effective to limit the value of said control pressure when a predetermined value of engine speed is exceeded, second control means responsive to said control pressure for regulating said downstream pressure, and means for cutting off the fuel flow thru said conduit in response to movement of said control lever means, whereby the fuel flow to the engine varies as a function of said engine air pressure, said speed, and said control lever.

15. Fuel control apparatus for an internal combustion engine having associated therewith a conduit for the flow of fuel thereto, a compressor for the supply of combustion air thereto, a fuel pump connected to said conduit, and a control lever, comprising: first valve means responsive to an air pressure differential derived from pressures in said engine and effective to derive a control fuel pressure in said first valve means from the pressure downstream from said pump, a thermal control responsive to a temperature in said engine and effective to limit said derived air pressure differential when a predetermined value of temperature is exceeded, second valve means responsive to said control pressure for regulating said downstream fuel pressure, third valve means responsive to said control lever and effective to cut off the fuel flow thru said conduit within a predetermined range of movement of said control lever means, and means for rotating at least one of said valves to prevent sticking thereof, whereby the fuel flow to the engine varies as a function of said engine pressures, said temperature, and said control lever.

16. Fuel control apparatus for an internal combustion engine having associated therewith a fuel pump and an air compressor for delivery of fuel and air, respectively, to said engine, and a control lever, comprising: a channel for the flow of fuel from the outlet to the inlet of said pump, a connection from said channel to the engine for delivering fuel thereto, a second channel for the flow of fuel from said first channel to said pump inlet, first valve means responsive to an air pressure differential across said compressor for regulating a control pressure in a portion of said second channel, second valve means responsive to said control pressure and adapted to regulate the pressure in said connection, control means operatively connected to said second valve means and being so constructed and arranged as to predetermine the range of values of the differential between said pressure in said connection and said control pressure, and third valve means connected to said engine control lever and adapted to shut off the fuel flow to said connection within a predetermined range of movement of said lever, whereby the fuel flow to the engine varies as a function of said air pressure differential and said control lever.

17. Fuel control apparatus for an internal combustion engine having associated therewith a fuel conduit for the flow of fuel thereto, a compressor for the supply of combustion air thereto, a pump for the supply of fuel to said conduit, and a control lever, comprising: a first channel connected to said conduit for flowing fuel from the outlet to the inlet of said pump, a second channel for the flow of fuel from said first channel to said pump inlet, first valve means responsive to an air pressure differential across said compressor and effective to regulate a control pressure in a portion of said second channel, a device responsive to the engine speed, second valve means responsive to said speed responsive device and effective to limit the value of said control pressure when a predetermined value of speed is exceeded, third valve means responsive to the fuel pressure differential between said control pressure and the pressure in said first channel and effective to regulate said pressure in said first channel, spring means connected to said third valve means for predetermining the range of values of said fuel pressure differential, fourth valve means connected to said control lever and effective to shut off the fuel flow to said conduit within a predetermined range of movement of said control lever, whereby the fuel flow to the engine varies as a function of said air pressure differential, said speed, and said control lever.

18. Fuel control apparatus for an internal combustion engine having associated therewith a fuel conduit for the flow of fuel thereto, a compressor for the supply of combustion air thereto, a pump for the supply of fuel to said conduit, and a control lever, comprising: a first channel connected to said conduit for flowing fuel from the outlet to the inlet of said pump, a second channel for the flow of fuel from said first channel to said pump inlet, first valve means responsive to an air pressure differential across said compressor and effective to regulate a control pressure in a portion of said second channel, a device responsive to the engine speed, second valve means responsive to said speed responsive device and effective to limit the value of said control pressure when a predetermined value of speed is exceeded, third valve means responsive to the fuel pressure differential between said control pressure and the pressure in said first channel and effective to regulate said pressure in said first channel, spring means connected to said third valve means for predetermining the range of values of said fuel pressure differential, fourth valve means connected to said control lever and effective to shut off the fuel flow to said conduit within a predetermined range of movement of said control lever, cam means connected to said second valve means responsive to said control lever and effective to vary said predetermined value of speed, means for guiding each of said valves and means for rotating at least one of said valves relative to its coacting guide means to prevent sticking of said valve therein, whereby the fuel flow to the engine varies as a function of said compressor pressure differential, said speed, and said control lever.

19. Fuel control apparatus for an internal combustion engine having associated therewith a fuel conduit for the flow of fuel thereto, a compressor for the supply of combustion air thereto, a pump for the supply of fuel to said conduit and a manually operated control lever, comprising: a first channel connected to said conduit for flowing fuel from the outlet to the inlet of said pump, a second channel for flowing fuel from said first channel to said pump inlet, a first valve responsive to an air pressure differential derived from the pressure differential across said compressor and effective to regulate a control pressure in said second channel, a device responsive to the engine speed, a second valve responsive to said device and effective to limit the value of said control pressure when a predetermined value of speed is exceeded, a third valve responsive to the fuel pressure differential between the pressure in said first channel and said control pressure and effective to regulate said pressure in said first channel, spring means connected to said third valve for predetermining the range of values of said fuel pressure differential, a fourth valve connected to said control lever and effective to shut off the fuel flow to said conduit within a predetermined range of movement of said control lever, cam means connected to said second valve responsive to said control lever and effective to vary said predetermined value of speed, means for guiding each of said valves and means for rotating said first, said second, said third and said fourth valves relative to their coacting guide means to prevent sticking of said valves therein, and a thermal control responsive to an engine temperature and effective to limit the value of said derived air pressure differential when a predetermined value of temperature is exceeded, whereby the fuel flow to said engine varies as a function of said compressor pressure differential, said speed, said temperature, and said engine control lever.

20. Fuel control apparatus for an internal combustion engine having assoicated therewith a fuel conduit for the flow of fuel thereto, a compressor for the supply of combustion air thereto, and a pump for the supply of fuel to said conduit, comprising: first and second channels for the flow of fuel from the outlet to the inlet of said pump, said conduit being connected to said second channel and subject to the pressure therein, means responsive to an air pressure across said compressor, a first valve responsive to said pressure responsive means and effective to vary a fuel pressure on the upstream side thereof in said first channel, said varied fuel pressure being proportional to said air pressure, a second valve in said second channel responsive to the fuel pressure differential between the pressure in said second channel and said varied fuel pressure, said second valve being effective to control the flow and hence the pressure in said second channel, thereby controlling the pressure and hence the flow in said conduit, whereby the fuel flow to the engine is a function of said air pressure differential.

21. Fuel control apparatus for an internal combustion engine having associated therewith a compressor and a pump for the supply of combustion air and fuel thereto, comprising: first and second channels for the flow of fuel from the outlet to the inlet of said pump, a bellows responsive to the air pressure across said compressor, a first valve in said first channel responsive to said bellows, said first valve being also responsive to and effective to regulate a fuel pressure on the upstream side thereof in a portion of said first channel, said upstream fuel pressure being proportional to said downstream air pressure, a third channel for the flow of fuel from said upstream side of said first valve to said pump inlet and a restriction in said third channel, a connection for the flow of fuel from said second channel to said engine as a function of the pressure in said second channel, a second valve in said second channel for controlling the flow thru said second channel and hence the pressure therein, said second valve being responsive to the fuel pressure differential between the pressure in said second channel upstream from said connection and the control pressure in said third channel downstream from said restriction, said control pressure being equal to said pressure upstream from said first valve and hence proportional to said air pressure differential when there is no flow thru said restriction, a control spring biasing said second valve in opposition to said fuel pressure differential and effective to determine the value thereof, a device responsive to the engine speed, a third valve in said third channel downstream from said restriction effective to cause flow from said third channel and hence to reduce the value of said control pressure when a predetermined value of said speed is exceeded, whereby the fuel flow to the engine varies as a function of said air pressure differential and said speed.

22. Fuel control apparatus for an internal combustion engine having associated therewith a compressor and a pump for the supply of combustion air and fuel thereto, comprising: first and second channels for the flow of fuel from the outlet to the inlet of said pump, a bellows responsive to the air pressure across said compressor, a first valve in said first channel responsive to said bellows, said first valve being also responsive to and effective to regulate the fuel pressure on the upstream side thereof in a portion of said first channel, said upstream fuel pressure being proportional to said air pressure differential, a third channel for the flow of fuel from said upstream side of said first valve to said pump inlet and a restriction in said third channel, a connection for the flow of fuel from said second channel to said engine, the respective pressures in said connection and said second channel being equal, a second valve in said second channel for controlling the flow thru said second channel and hence the pressure therein, said second valve being responsive to the fuel pressure differential between the pressure in said second channel upstream from said connection and the control pressure in said third channel downstream from said restriction, said control pressure being equal to said pressure upstream from said first valve and hence proportional to said air pressure differential when there is no flow thru said restriction, manually operated means and a control spring supported thereby, said control spring biasing said second valve in opposition to said fuel pressure differential and effective to maintain said fuel pressure differential within a predetermined range of values when the position of said manually operated means is mixed, said manually operated means being effective to vary said predetermined range of values, a device responsive to the engine speed, a third valve effective to cause flow from said third channel and hence to reduce the value of said control pressure when a predetermined setting value of said speed is exceeded, a governor spring effective to determine said setting value of speed, means for guiding each of said valves and means for rotating at least one of said valves relative to its coacting guide means to prevent sticking of said valve therein, whereby the fuel flow to the engine varies as a function of said air pressure differential, said manually operated means. and said speed.

23. Fuel control apparatus for an internal combustion engine having associated therewith a fuel conduit for the flow of fuel thereto, a compressor for the supply of combustion air thereto, a pump for the supply of fuel to said conduit, and a control lever, comprising: first and second channels for the flow of fuel from the outlet to the inlet of said pump, a bellows having a bellows spring connected thereto, said bellows being responsive to an air pressure differential across said compressor in opposition to said bellows spring, a first valve in said first channel responsive to said bellows and effective to regulate the pressure on the upstream side thereof in a portion of said first channel, said upstream fuel pressure being proportional to said air pressure differential, a third channel connected to said upstream side of said first valve for the flow of fuel therefrom to said pump inlet and a restriction in said third channel, a connection between said second channel and said conduit, a second valve in said second channel for controlling the flow thru said second channel and hence the pressure upstream from said connection, said second valve being responsive to the fuel pressure differential between the pressure in said second channel upstream from said connection and the control pressure in said third channel downstream from said restriction, a first cam connected to said control lever and a control spring responsive to movement of said first cam, said control spring biasing said second valve in opposition to said fuel pressure differential and effective to maintain said fuel pressure differential within a predetermined range of values when the position of said first cam is fixed, said first cam being effective to vary said predetermined range of values, a device responsive to the engine speed, a third valve in said third channel and effective to cause flow therefrom and hence to reduce the value of said control pressure when a predetermined setting value of speed is exceeded, a governor valve spring effective to determine said setting value of speed, a second cam connected to said control lever, said second cam being effective to vary the deflection of said governor spring and hence said setting value of speed, whereby the fuel flow to the engine varies as a function of said air pressure differential, said speed, and said control lever.

24. Fuel control apparatus for an internal combustion engine having associated therewith a fuel conduit for the flow of fuel thereto, a compressor for the supply of combustion air thereto, a pump for the supply of fuel to said conduit and a manually operated control lever, comprising: first and second channels for the flow of fuel from the outlet to the inlet of said pump, a bellows responsive to the pressure across said compressor, a first valve in said first channel responsive to said bellows and effective to regulate the pressure on the upstream side thereof in a portion of said first channel, a third channel connected to said upstream side of said first valve for the flow of fuel therefrom to said pump inlet and a restriction in said third channel, a connection between said second channel and said conduit, a second valve in said second channel for controlling the flow thru said second channel and hence the pressure upstream from said connection, said second valve being responsive to the fuel pressure differential between the pressure in said second channel upstream from said connection conduit and the control pressure in said third channel downstream from said restriction, first means rendering said control lever effective to vary said fuel pressure differential, a device responsive to the engine speed, a third valve effective to cause flow from said third channel and hence to reduce the value of said control pressure when a predetermined setting value of speed is exceeded, second means rendering said control lever effective to determine said setting value of speed, a fourth valve connected to said control lever effective to shut off the fuel flow thru said conduit within a predetermined range of movement of said control lever, means for guiding each of said valves and means for rotating at least one of said valves relative to its coacting guide means to prevent sticking of said valve therein, whereby the fuel flow to the engine varies as a function of said pressure across said compressor, said speed, and said control lever.

25. Fuel control apparatus for an internal combustion engine having associated therewith a fuel conduit for the flow of fuel thereto, a compressor for the supply of combustion air thereto, and a pump for the supply of fuel to said conduit, comprising: first and second channels for the flow of fuel from the outlet to the inlet of said pump, means responsive to an air pressure differential across said compressor, a first valve in said first channel operated by said pressure responsive means, said first valve being effective to regulate a fuel pressure on the upstream side thereof in said first channel, a third channel for the flow of fuel from said upstream side of said first valve to said pump inlet and a restriction in said third channel, a connection between said second channel and the inlet to said conduit, a second valve in said second channel, said second valve being responsive to the fuel pressure differential thereacross between the pressure in said second channel upstream from said conduit and the control pressure in said third channel downstream from said restriction, first manually operated spring means determining the value of said fuel pressure differential, a device responsive to the engine speed, a third valve connected to said device and effective to drain fuel from said third channel and hence to reduce said control pressure when a predetermined setting value of speed is exceeded, second manually operated spring means determining said setting value of speed and a connection between said first and second manually operated means, a fourth valve effective to cut off the flow thru said conduit within a predetermined range of movement of said first manually operated spring means, and a thermal control responsive to an engine temperature and effective to limit the value of said air pressure differential when a predetermined value of temperature is exceeded, whereby the fuel flow to the engine varies as a function of said air pressure differential, the engine speed, said temperature, and said manually operated means.

26. Fuel control apparatus for an internal combustion engine having associated therewith a fuel conduit for the flow of fuel thereto, a compressor for the supply of combustion air thereto, a pump for the supply of fuel to said conduit and a manually operated control lever, comprising: first and second channels for the flow of fuel from the outlet to the inlet of said pump, a bellows responsive to an air pressure differential across said compressor, a first valve in said first channel responsive to said bellows and effective to regulate the pressure on the upstream side thereof in said first channel, a third channel connected to said upstream side of said first valve for the flow of fuel therefrom to said pump inlet and a restriction in said third channel, a connection between said second channel and said conduit, a second valve in said second channel for controlling the flow thru said second channel, said second valve being responsive to the fuel pressure differential between the pressure in said second connection upstream from said conduit and the control pressure in said third channel downstream from said restriction, a first cam connected to said control lever and a control spring responsive to movement of said first cam, said control spring biasing said second valve in opposition to said fuel pressure differential and effective to maintain said fuel pressure differential within a predetermined range of values when the position of said first cam is fixed, said first cam being effective to vary said predetermined range of values, a device responsive to the engine speed, a third valve in said third channel effective to drain fuel therefrom and hence to reduce the value of said control pressure when a predetermined setting value of speed is exceeded, a governor spring effective to determine said setting value of speed, a second cam connected to said first cam and hence to said control lever, said second cam being effective to vary the deflection of said governor spring and hence said setting value of speed, a fourth valve connected to said first cam effective to cut off the flow of fuel thru said conduit when said control lever is in a predetermined position, said first cam being effective to progressively vary said fuel pressure differential from minimum to maximum values within a predetermined first range of movement of said control lever from said predetermined position and being also effective to maintain said maximum value of said fuel pressure differential within a predetermined second range of movement of said control lever, means for guiding each of said valves and means for rotating said first, said second, and said third valves relative to their respective coacting guide means to prevent sticking of said valves therein, and a thermal control responsive to the engine temperature for modifying said air pressure differential when a predetermined value of temperature is exceeded, whereby the fuel flow to the engine varies as a function of said air pressure differential, said speed, and said control lever.

27. Fuel control apparatus for an internal combustion engine having associated therewith a fuel conduit for the flow of fuel thereto, a compressor for the supply of combustion air thereto, and a pump for the supply of fuel to said conduit, comprising: first and second channels for the flow of fuel from the outlet to the inlet of said pump, means responsive to an air pressure differential across said compressor, first valve means in said first channel operated by said air pressure differential responsive means, regulating means for maintaining the pressure of fuel on the upstream side of said first valve means at a substantially constant value, said first valve means being effective to vary a control pressure on the downstream side thereof according to a predetermined function of said air pressure differential, a connection between said second channel and said conduit, a second valve in said second channel, said second valve being responsive to the fuel pressure differential thereacross between the pressure in said second connection and said conduit and said control pressure and effective to regulate said conduit pressure, whereby the fuel flow to the engine varies as a function of said air pressure differential.

28. Fuel control apparatus for an internal combustion engine having associated therewith a fuel conduit for the flow of fuel thereto, a compressor for the supply of combustion air thereto, and a pump for the supply of fuel to said conduit, comprising: first, second, and third channels for the flow of fuel from the outlet to the inlet of said pump, a first valve in said first channel effective to regulate the pressure on the upstream side thereof in a portion of said first channel, a first spring acting on said valve in opposition to said regulated pressure to maintain a substantially constant value thereof, a bellows responsive to the air pressure across said compressor, a second valve in said second channel responsive to said bellows for varying the flow thru said second channel, said second valve having the upstream side thereof subject to said regulated pressure in said first channel and being effective to vary the pressure in said second channel on the downstream side of said second valve as a predetermined function of said air pressure differential, a connection between said third channel and said conduit, a third valve in said third channel downstream from said connection, said third valve being responsive to the fuel pressure differential thereacross between the pressure in said conduit and said pressure downstream from said second valve and being effective to regulate said conduit pressure, a second spring biasing said third valve in opposition to said fuel pressure differential for maintaining a substantially constant value thereof, a device responsive to the engine speed, a fourth valve responsive to said device and effective to decrease said pressure downstream from said second valve when a predetermined value of speed is exceeded, means for guiding each of said valves and means for rotating at least one of said first, said second, said third, and said fourth valves relative to their respective coacting guide means to prevent sticking of said valves therein, whereby the fuel flow to the engine varies as a function of said engine air pressure and said speed.

29. Fuel control apparatus for an internal combustion engine having associated therewith a fuel conduit for the flow of fuel thereto, a compressor for the supply of combustion air thereto, a pump for the supply of fuel to said conduit, and a control lever, comprising: first, second, and third channels for the flow of fuel from the outlet to the inlet of said pump, a first valve in said first channel effective to regulate the pressure on the upstream side thereof in a portion of said first channel, a first manually operated cam and a first spring in compression between said first valve and said first cam for maintaining said regulated pressure at a substantially constant value determined by the position of said first cam, a bellows having a bellows spring therein, said bellows being responsive to an air pressure differential across said compressor in opposition to said bellows spring, a restriction in said second channel having the downstream side thereof subject to inlet pressure of said pump, a second valve in said second channel upstream from said restriction responsive to said bellows and effective to vary the flow thru said second channel, said second valve having the upstream side thereof subject to said regulated pressure in said first channel and being effective to vary the pressure in said second channel between said second valve and said restriction as a preselected function of said air pressure, said second valve being contoured in accordance with said preselected function, a connection between said third channel and said conduit, a third valve in said third channel downstream from said connection, said third valve being responsive to the fuel pressure differential thereacross between the pressure in said conduit and said pressure downstream from said second valve and being effective to regulate said conduit pressure, a second manually operated cam and a second spring in compression between said second cam and said third valve in opposition to said fuel pressure differential, said second spring being effective to maintain a substantially constant range of values of said fuel pressure differential when the position of said second cam is fixed, said second cam being effective to vary said range of said differential values, a device responsive to the engine speed, and a governor spring for varying the response of said device to said speed, a fourth valve in parallel with said restriction in said second channel operated by said device and effective to decrease said pressure between said second valve and said restriction when a value of speed preestablished by the deflection of said spring is exceeded, a third manually operated cam for varying said deflection of said governor spring and hence for varying said pre-established value of said speed, connections between said first, said second, and said third manually operated cams and said control lever for rendering said three cams simultaneously responsive to movement of said control lever, whereby the fuel flow to the engine varies as a function of said air pressure differential, said speed, and said control lever.

30. Fuel control apparatus for an internal combustion engine having associated therewith a fuel conduit for the flow of fuel thereto, a compressor for the supply of combustion air thereto, a pump for the supply of fuel to said conduit, and a control lever, comprising: first, second, and third channels for the flow of fuel from the outlet to the inlet of said pump, a first valve in said first channel effective to regulate the pressure on the upstream side thereof in a portion of said first channel at a substantially constant value, first cam means operable by said control lever for predetermining the value of said substantially constant regulated pressure in said portion of said first channel, a bellows responsive to an air pressure differential across said compressor, a restriction in said second channel at the downstream end thereof, a second valve in said second channel upstream from said restriction responsive to said bellows and effective to vary the flow thru said second channel, said second valve having the upstream side thereof subject to said regulated pressure and being effective to vary the control pressure in said second channel between said second valve and said restriction as a preselected function of said air pressure differential, a device responsive to the engine speed, a third valve operated by said device and effective to decrease said control pressure when a pre-established value of speed is exceeded, second cam means operable by said control lever for determining said pre-established value of speed, a connection between said conduit and said third channel, a fourth valve in said third channel downstream from said connection responsive to said control pressure and effective to regulate said conduit pressure as a function of said control pressure, a spring for maintaining said function of said control pressure substantially constant, third cam means and a fifth valve in said conduit responsive to said third cam means and effective to override regulation of said conduit pressure as a function of said air pressure differential, said speed, and said first and second cam means to restrict the flow from said third channel to said conduit, said third cam means being also effective when said flow to said conduit is cut off by said fifth valve to override response of said fourth valve to said control pressure and to positively open said fourth valve a predetermined amount, said control lever being effective to manually control the fuel flow in said conduit from zero to a relatively low value and to vary said setting speed between minimum and slightly greater than minimum values in a first range of lever movement, to vary said conduit flow between said relatively low and relatively high values and to vary said speed between said slightly greater than minimum value and a maximum value in a second successive range of lever movement, and to maintain said speed at said maximum value and to vary said conduit flow between said relatively high value and a maximum value in a third successive range of lever movement.

31. Fuel control apparatus for an internal combustion engine having associated therewith a fuel conduit for the flow of fuel thereto, a compressor for the supply of combustion air thereto, and a pump for the supply of fuel to said conduit, comprising: first and second channels for the flow of fuel from the outlet to the inlet of said pump, means responsive to an air pressure across said compressor, valve means in said first channel responsive to said air pressure responsive means for controlling the pressure downstream from said valve means, said valve means including a valve and a generally cylindrical valve guide having a port therein, said valve being slidable in said guide in the direction of the force imposed thereon by said air pressure differential responsive means, means maintaining the pressure on the upstream side of said valve at a predetermined substantially constant value, manually operated means determining said substantially constant value, means rotating said valve relative to said guide independently of said relative sliding motion therebetween, the plane of said rotation being at right angles to said sliding movement, at least one slot on the periphery of said valve and effective to permit intermittent flow of fuel from the upstream side of said valve thru said port as said rotation occurs, said slot being contoured to vary the effective area of said flow in response to said sliding movement of said valve in said guide so that the control pressure on the downstream side of said valve varies as a predetermined function of said sliding movement and hence as a predetermined function of said air pressure, regulating means in said second channel responsive to said control pressure for controlling the fuel pressure differential between the pressure in said conduit and said control pressure, spring means maintaining said fuel pressure differential at a substantially constant value thereby rendering said regulating means effective to regulate said pressure in said fuel conduit, whereby the fuel flow to the engine varies as a function of said air pressure differential and said manually operated means.

32. Fuel control apparatus for an internal combustion engine having associated therewith a fuel conduit for the flow of fuel thereto, a compressor for the supply of combustion air thereto, a pump for the supply of fuel to said conduit, and a control lever, comprising: a channel and a control pressure conduit for the flow of fuel from the outlet to the inlet of said pump, a bellows responsive to an air pressure differential across said compressor and a first valve operable by said bellows for varying said control pressure in a portion of said control pressure conduit, means for regulating the pressure upstream from said first valve at a substantially constant predetermined value above said control pressure, spring means predetermining said pressure value, cam means connected to said spring means and effective to vary said predetermined pressure value, a valve guide and a port therein connected to said control pressure conduit, said first valve being slidable in said guide in response to and in the direction of the force imposed thereon by said bellows, means providing relative rotary motion between said first valve and said guide, the axis of said rotation being parallel with said direction of said force, said first valve being effective to vary the effective area of flow from the upstream side thereof and thru said port to said fuel pressure conduit as said sliding motion occurs and being also effective to interrupt the flow to said port as a function of said relative rotary motion between said first valve and said first guide, said first valve and said port being contoured so that the flow across said first valve and hence said control pressure is a preselected function of said air pressure differential, a connection between said fuel conduit and the outlet of said pump for the flow of fuel therebetween, a spring and a second valve in said channel responsive to said spring and to the fuel pressure differential between the pressure in said conduit and said control pressure, said second valve being effective to control said fuel pressure differential and said spring being effective to determine the range of values of said fuel pressure differential as said control pressure varies between maximum and minimum values, a thermal control responsive to a temperature in the engine and effective to reduce said air pressure differential when a predetermined value of temperature is exceeded, whereby the fuel flow to the engine varies as a function of said air pressure differential, said control lever, and said temperature.

33. Fuel control apparatus for an internal combustion engine having associated therewith a fuel conduit for the flow of fuel thereto, a compressor for the supply of combustion air thereto, a pump for the supply of fuel to said conduit and a manually operated control lever, comprising: a bellows responsive to the air pressure differential across said compressor, a control pressure conduit for the flow of fuel from the outlet to the inlet of said pump, a first valve in said control pressure conduit responsive to said bellows for varying the flow of fuel thereacross, first and second channels for the flow of fuel from the outlet to the inlet of said pump and a second valve in said first channel for supplying fuel to said first valve, spring means connected to said second valve for maintaining the pressure of fuel on the upstream side of said first valve at a substantially constant predetermined value, first cam means connected to said spring and to said control lever for varying said predetermined value, a valve guide and a port therein connected to said control pressure conduit, said first valve and said guide having relative linear motion in response to and in the direction of the force imposed on said first valve by said bellows, means providing relative rotary motion between said first valve and said guide on a central axis parallel with said direction of force, said first valve being effective to vary the effective area of flow thereacross and thru said port as said relative linear motion occurs and being also effective to interrupt the flow to said port at regular intervals as a function of said relative rotary motion between said first valve and said guide, said first valve and said port being contoured so that the flow in said control pressure conduit and hence the control pressure downstream from said first valve varies as a preselected function of said air pressure differential, a connection for flowing fuel from said pump outlet to said conduit, a third valve in said second channel downstream from said connection responsive to said control pressure and effective to vary the differential thereacross between the pressure in said conduit and said control pressure, a spring for maintaining a substantially constant range of values of said fuel pressure differential, a device responsive to the engine speed, valve means operable by said device and effective to reduce said control pressure when a predetermined value of speed is exceeded, means responsive to said control lever effective to vary the effective area of flow thru said fuel conduit between zero and maximum values, means for guiding each of said valves and said control lever responsive means and drive means for rotating said second valve, said third valve, and said control lever responsive means relative to their respective coacting guide means to prevent sticking of said valves and means therein, whereby the fuel flow to the engine varies as a function of said compressor pressure differential, said speed, and said control lever.

34. Fuel control apparatus for an internal combustion engine having associated therewith a fuel conduit for the flow of fuel thereto, a compressor for the supply of combustion air thereto, and a pump for the supply of fuel to said conduit, comprising: first and second channels for the flow of fuel from the outlet to the inlet of said pump, means responsive to an air pressure differential across said compressor, a first valve in said first channel operated by said pressure differential responsive means, said first valve being effective to regulate a fuel pressure on the upstream side thereof in said first channel, a third channel for the flow of fuel from said upstream side of said first valve to said pump inlet and a restriction in said third channel, a connection between said second channel and the inlet to said conduit, a second valve in said second channel, said second valve being responsive to the fuel pressure differential thereacross between the pressure in said second channel upstream from said conduit and the control pressure in said third channel downstream from said restriction, first manually operated spring means determining the value of said fuel pressure differential, a device responsive to the engine speed, a third valve connected to said device and effective to drain fuel from said third channel and hence to reduce said control pressure when a predetermined setting value of speed is exceeded, second manually operated spring means determining said setting value of speed and a connection between said first and second manually operated means, a fourth valve effective to cut off the flow through said conduit within a predetermined range of movement of said first manually operated spring means, a thermal control responsive to an engine temperature and effective to limit the value of said air pressure differential when a predetermined value of temperature is exceeded, at least two of said four valves being aligned, means for guiding each of said valves and means rotating said aligned valves relative to their respective guide means by a common drive to prevent sticking of said valves in their respective guide means, whereby the fuel flow to the engine varies as a function of said air pressure differential, the engine speed, said temperature, and said manually operated means.

LEIGHTON LEE II.

References Cited in the file of this patent

UNITED STATES PATENTS

| Number | Name | Date |
| --- | --- | --- |
| 1,052,588 | Janicki | Feb. 11, 1913 |
| 1,752,135 | Wünsch | Mar. 25, 1930 |
| 2,136,959 | Winfield | Nov. 15, 1938 |
| 2,219,994 | Jung | Oct. 29, 1940 |
| 2,264,874 | Day | Dec. 2, 1941 |
| 2,382,707 | Gosslau et al. | Aug. 14, 1945 |
| 2,422,808 | Stokes | June 24, 1947 |
| 2,442,049 | Lee | May 25, 1948 |